US008144557B2

(12) United States Patent
Nishimura

(10) Patent No.: US 8,144,557 B2
(45) Date of Patent: Mar. 27, 2012

(54) OPTICAL INFORMATION RECORDING/REPRODUCING APPARATUS AND DISK DISTINCTION METHOD

(75) Inventor: Koichiro Nishimura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 587 days.

(21) Appl. No.: 12/235,666

(22) Filed: Sep. 23, 2008

(65) Prior Publication Data

US 2009/0086606 A1 Apr. 2, 2009

(30) Foreign Application Priority Data

Sep. 28, 2007 (JP) ................................ 2007-256327

(51) Int. Cl.
*G11B 7/00* (2006.01)

(52) U.S. Cl. ....................................... 369/53.2; 369/103

(58) Field of Classification Search ........................ None
See application file for complete search history.

(56) References Cited

U.S. PATENT DOCUMENTS 6,466,531 B1 * 10/2002 Lee ............................ 369/53.2
RE39,025 E * 3/2006 Lee et al. ...................... 359/719
2009/0279406 A1 * 11/2009 Ogasawara .................. 369/103

FOREIGN PATENT DOCUMENTS

EP 1 624 451 A1 2/2006
JP 2004-272268 9/2004
WO WO 2004/102542 A1 11/2004

* cited by examiner

*Primary Examiner* — Thang Tran
*Assistant Examiner* — Huy D Nguyen
(74) *Attorney, Agent, or Firm* — Antonelli, Terry, Stout & Kraus, LLP.

(57) ABSTRACT

An optical information recording/reproducing apparatus includes an optical source unit that emits an optical beam toward an optical information recording medium mounted on the apparatus, an optical receiving unit that receives a reflected beam of the optical beam reflected from the optical information recording medium or a transmitted beam of the optical beam transmitted through the optical information recording medium to output an output signal in response to the reflected beam or transmitted beam, and a distinction unit that discriminates whether the optical information recording medium is a hologram disk for recording information by using a holography or a reflection-type optical disk for reproducing information by virtue of the reflected beam, in accordance with the output signal output.

12 Claims, 18 Drawing Sheets

OPTICAL INFORMATION RECORDING/REPRODUCING APPARATUS AND DISK DISTINCTION METHOD

INCORPORATION BY REFERENCE

The present application claims priority from Japanese application JP-2007-256327 filed on Sep. 28, 2007, the content of which is hereby incorporated by reference into this application.

BACKGROUND OF THE INVENTION

The present invention relates to an apparatus and a method for recording and/or reproducing information in relation to an optical information recording medium by using a holography.

In the past, there have been an optical information recording and/or reproducing apparatus that records information in an information recording area (information recording surface) and/or reproduces the information from the area, of a reflection-based optical information recording medium (optical disk), such as CD (Compact Disk), DVD (Digital Versatile Disk), etc.

Recently, it is also possible to realize commercially available reflection-based disks having a recording density as large as 50 GB in consumer use, in accordance with the specifications of Blu-ray disk (hereinafter, referred to as BD) using a blue-violet semiconductor laser, HD DVD (High Definition DVD), etc. On the contrary, it is also desirable to realize an optical disk having a large storage capacity as large as 100 GB to 1 TB mostly equal to the storage capacity of HDD (Hard Disk Drive).

However, for a purpose of realizing the foregoing ultra-high density by the optical disk, it is necessary to realize a new storage technique different from the existing high density technique obtained from the traditional approach such that a wavelength is made short and NA of an objective lens is made high. Consequently, a holographic recording technique has attracted attention in these years such that digital information is recorded by using a holography. According to the holographic recording technique, it is effective to record and reproduce information in large volume and high speed since two-dimensional information can be recorded and reproduced simultaneously by one hologram, and plural pieces of page data can be written over the same area.

As an example of the holographic recording technique indicated above, there is an angle multiplex recording system, in which a signal beam is focused on a holographic optical disk (hereinafter, referred to as a hologram disk) by a lens, at the same time, a reference beam of a parallel pencil is irradiated thereon and interfered to record a hologram, and each piece of page data is displayed on a spatial light modulator to perform a multiple recording while an incidence angle of the reference beam toward the hologram disk is changed. The foregoing technique has been disclosed in JP-A-2004-272268.

WO2004-102542 has also proposed a holographic recording technique using a shift multiplexing, in which a beam from pixels inside one spatial light modulator is regarded as a signal beam, and a beam from pixels of orbicular zone shape outside the spatial light modulator is regarded as a reference beam, both the foregoing beams are then focused on the hologram disk by the same lens used for both the beams, and the signal beam and reference beam are made interference with each other in the vicinity at a focal plane of the lens to thereby record a hologram.

SUMMARY OF THE INVENTION

In the case of an optical information recording/reproducing apparatus adaptable to the hologram disk, it is desirable that information can also be recorded and reproduced in and from the existing reflection-type optical disk (referred to as an optical disk on which an optical beam is irradiated to reproduce information on the basis of a reflected beam) typically used as CD, DVD, BD, etc., from a point of view relative to compatibility with a high-order device. In this regard, since the recording/reproducing system of the reflection-type optical disk is quite different from that of the hologram disk, it is desirable that the optical information recording/reproducing apparatus is constituted such that an optical disk mounted on the apparatus is discriminated automatically whether it is the reflection-type optical disk or hologram disk, and information is recorded or reproduced by the recording/reproducing system adapted to the optical disk on the basis of a discriminated result.

In this way, the optical information recording/reproducing apparatus is constituted by the foregoing manner, so that a user can use the apparatus without regard to the type of mounting optical disk, in addition, usability of the apparatus can be enhanced.

The present invention is realized by considering the foregoing points, and an object of the invention is to provide an optical information recording/reproducing apparatus capable of enhancing usability.

In order to achieve the foregoing object of the invention, according to a first aspect of the invention, the optical information recording/reproducing apparatus records information in an optical information recording medium and reproduces the information recorded on the medium, and the apparatus includes: an optical source unit that emits an optical beam toward the optical information recording medium mounted on the apparatus; an optical receiving unit that receives a reflected beam of the optical beam reflected from the optical information recording medium or a transmitted beam of the optical beam transmitted through the optical information recording medium to output an output signal in response to the reflected beam or transmitted beam; and a distinction unit that discriminates whether the optical information recording medium is a hologram disk for recording information by using a holography or a reflection-type optical disk for reproducing information by virtue of the reflected beam, in accordance with the output signal output from the optical receiving unit.

According to a second aspect of the invention, a disk distinction method includes steps of recording information in an optical information recording medium and/or reproducing the information recorded on the medium in an optical information recording/reproducing apparatus, and the method further includes steps of: emitting an optical beam toward the optical information recording medium mounted on the apparatus; receiving a reflected beam of the optical beam reflected from the optical information recording medium or a transmitted beam of the optical beam transmitted through the optical information recording medium and outputting an output signal in response to the reflected beam or transmitted beam; and discriminating whether the optical information recording medium is a hologram disk for recording information by using a holography or a reflection-type optical disk for reproducing information by virtue of the reflected beam in accordance with the output signal, on the basis of the output signal.

According to the invention, the optical information recording/reproducing apparatus can be used by a user without regard to the type of mounting optical disk, so that usability of the apparatus can be enhanced.

The other objects, features and advantages of the invention will become apparent from the following description of the embodiments of the invention taken in conjunction with the accompanying drawings.

DETAILED DESCRIPTION OF THE INVENTION

Hereinafter, embodiments of the invention will be described with reference to the drawings.

Figure 1:
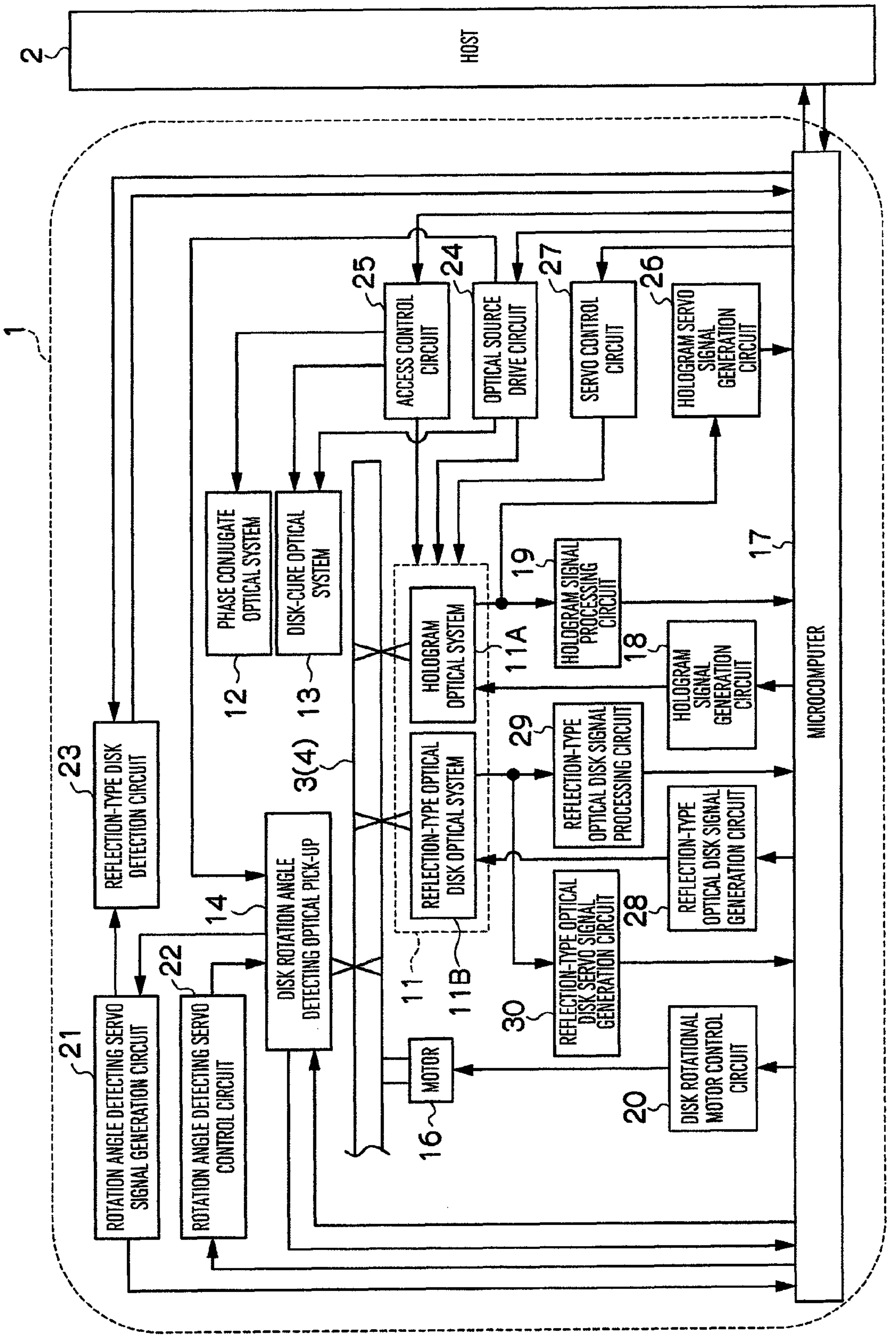
FIG. 1 is a block diagram showing an optical information recording/reproducing apparatus in a first embodiment.

(1) First Embodiment (1-1) Constitution of the Optical Information Recording/Reproducing Apparatus in the First Embodiment;

Referring to FIG. 1, a reference numeral 1 denotes an optical information recording/reproducing apparatus in the embodiment as a whole. The optical information recording/reproducing apparatus records and reproduces information in and from a hologram disk 3 in response to a request from a host device 2, as well as in and from a reflection-type optical disk 4.

The optical information recording/reproducing apparatus 1 in the embodiment provides with an optical pick-up 11, a phase conjugate optical system 12, a disk-cure optical system 13, a disk rotation angle detecting optical pick-up 14, a rotational motor 16, and a microcomputer 17 for controlling the foregoing components. In this way, an optical disk (including the hologram disk 3 and reflection-type optical disk 4) mounted on the apparatus in a predetermined condition is driven rotatably by the rotational motor 16.

The optical pick-up 11 is constituted by a hologram optical system 11A for recording/reproducing information in and from the hologram disk 3 and a reflection-type optical disk optical system 11B for recording/reproducing information in and from the reflection-type optical disk 4.

The hologram optical system 11A emits a reference beam and a signal beam to the hologram disk 3 to serve as a recording of digital information by using a holography. At this time, an information signal to be recorded is generated by applying a predetermined signal processing to the digital information supplied from the host 2 to the microcomputer 17 in a hologram signal generation circuit 18. On the basis of this information signal, the signal beam formed by a spatial light modulation of an optical beam is generated in the hologram optical system 11A in the optical pick-up 11. An irradiation time period of the reference beam and signal beam to be irradiated on the hologram disk 3 can be adjusted by controlling an open-close time period of an after-mentioned shutter 42 (referring to FIG. 3) in the optical pick-up 11 via a shutter control circuit (not shown) by the microcomputer 17.

In the case of reproducing information recorded on the hologram disk 3, a phase conjugate beam of the reference beam emitted from the hologram optical system 11A is generated by the phase conjugate optical system 12 fitted on an opposite side of the hologram optical system 11A as based on the hologram disk 3. Here, the phase conjugate beam is a light wave which progresses toward a reverse direction while it keeps a wave surface identical with that of an input beam. A reproduced beam reproduced by the phase conjugate beam is detected by an after-mentioned optical detector 62 (referring to FIG. 3) in the hologram optical system 11A to reproduce a signal by a hologram signal processing circuit 19.

For a purpose of performing the foregoing recording/reproducing operation over an entire surface of the hologram disk 3, the hologram disk 3 is rotated by the rotational motor 16. In this case, it is desirable that the hologram disk 3 stands still on recording and reproducing information since a sufficient energy is required for stably recording information in the hologram disk 3. Therefore, in this embodiment, the microcomputer 17 controls the drive of rotational motor 16 via a disk rotational motor control circuit 20 such that information is recorded or reproduced while the hologram disk 3, in turn, stands still.

The disk-cure optical system 13 is used for generating an optical beam for purposes of a pre-cure and post-cure of the hologram disk 3. Here, the pre-cure means a pre-process that irradiates a predetermined optical beam on a desired position before irradiating the reference beam and signal beam thereon when information is recorded in the desired position of the hologram disk 3. Further, the post-cure means a post-process that irradiates a predetermined optical beam on the desired position to be set to a write inhibit, after the information is recorded on the desired position in the hologram disk 3.

Figure 2:
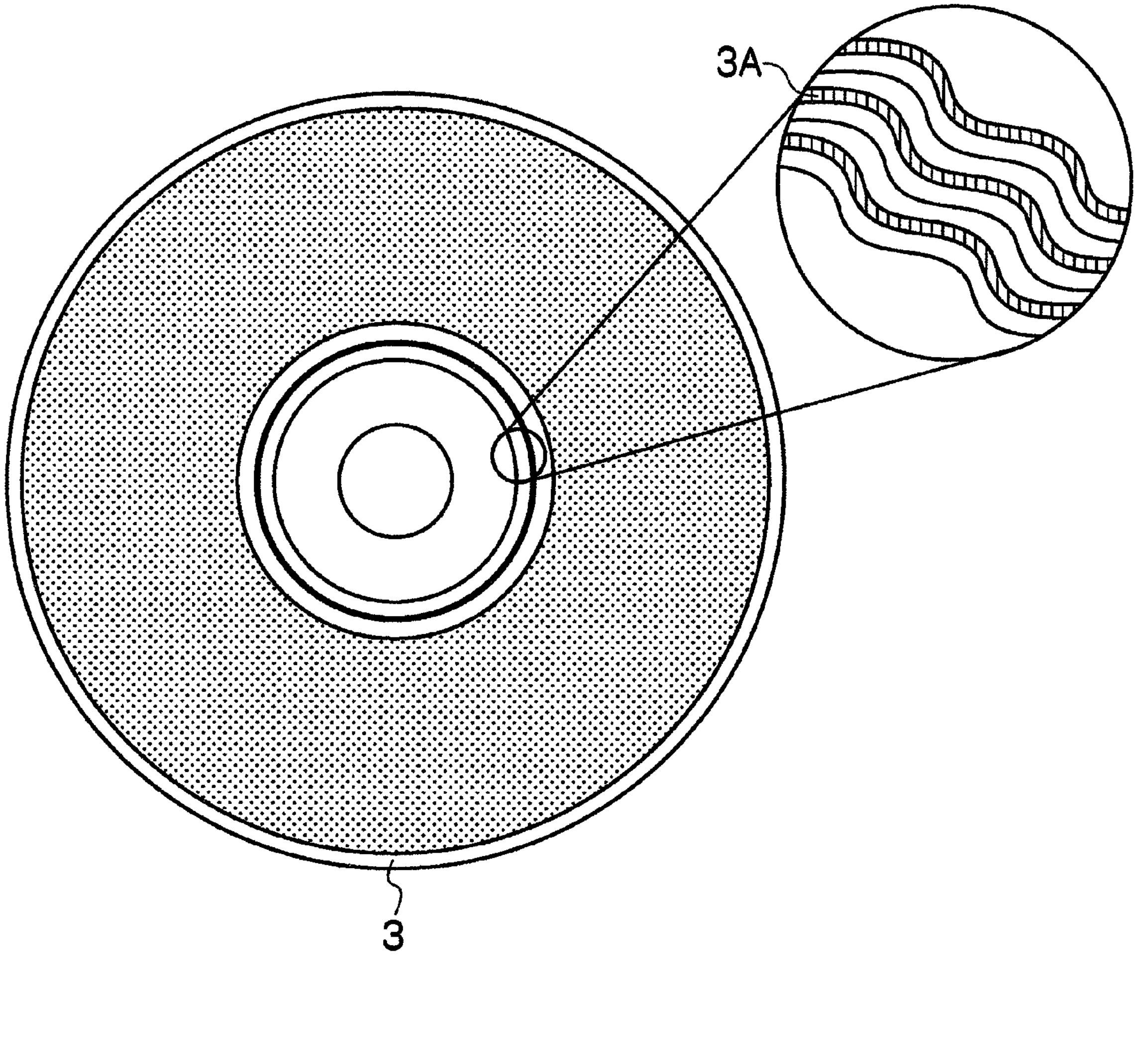
FIG. 2 is a schematic diagram for explaining a rotation angle control track.
Figure 4:
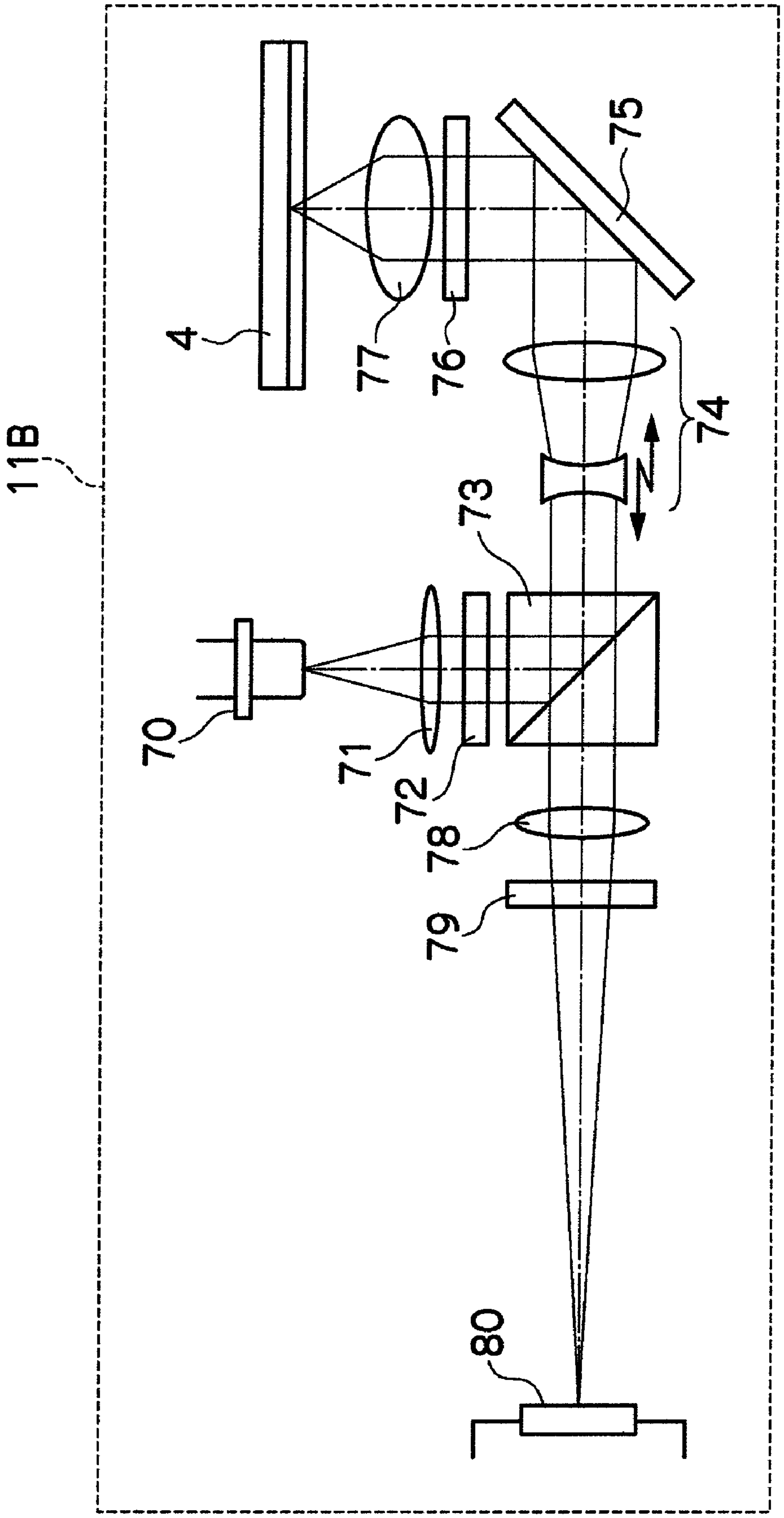
FIG. 4 is a schematic diagram showing a constitution of reflection-type optical disk optical system.

The disk rotation angle detecting optical pick-up 14 is an optical pick-up to detect a rotation angle of the hologram disk 3, and has the same constitution as the reflection-type optical disk optical system 11B in the after-mentioned optical pick-up 11 in FIG. 4. In this case of the embodiment, as shown in FIG. 2, a rotational angle control track 3A having a sine-wave shape to be set a predetermined rotation angle of the hologram disk 3 to one cycle and a reflection layer are formed at one innermost circle on a surface of the hologram disk 3 that faced to the disk rotation angle detecting optical pick-up 14, over one circle of the hologram disk 3. The disk rotation angle detecting optical pick-up 14 irradiates a red optical beam on the rotation angle control track 3A, on the basis of a reflected beam relative to the irradiation, a rotation angle detected signal is generated in response to the rotation angle of the hologram disk 3, and the rotation angle detected signal is then sent to the microcomputer 17. In this way, the microcomputer 17 controls the rotation angle of hologram disk 3 via the disk rotational motor control circuit 20 on the basis of the rotation angle detected signal.

In addition, a focusing (auto focus) of an optical spot in the optical beam on the hologram disk 3 is performed through a rotation angle detecting servo signal generation circuit 21 and a rotation angle detecting servo control circuit 22. A positioning (tracking) on a track (guide groove) is also performed through the circuits 21 and 22. Further, an existing-type disk detection circuit 23 has a function for generating a signal to discriminate whether a mounting optical disk, at this time, is the reflection-type optical disk 4 as an existing type, on the basis of a focusing error signal of a signal level corresponding to a defocusing amount of the optical beam relative to the optical disk, in which the focusing error signal is generated by the rotation angle detecting servo signal generation circuit 21. A specific constitution of the existing-type disk detection circuit 23 will be described later.

The following components have an optical source for each: the hologram optical system 11A and reflection-type optical disk optical system 11B in the optical pick-up 11; the disk-cure optical system 13; and the disk rotation angle detecting optical pick-up 14. These optical sources receive a predetermined optical source drive current from an optical source drive circuit 24. In this way, these optical sources can emit optical beams of a predetermined amount of light, respectively.

Further, each of the optical pick-up 11, phase conjugate optical system 12 and disk-cure optical system 13 has a slide mechanism to be able to slide its position in the radial direction of hologram disk 3, so that a position control can be performed through an access control circuit 25. Therefore, it is possible to record and reproduce information in and from the entire surface of the disk by the position control.

In addition, for a purpose of realizing downsizing for the optical information recording/reproducing apparatus 1, the components such as optical pick-up 11, phase conjugate optical system 12, disk-cure optical system 13 and disk rotation angle detecting optical pick-up 14, may be simplified to an optical construction including a few or all components. Further, since the recording technique using the holography is a technique to be able to record super-dense information, for example, there is a tendency for an allowable error to become extremely small in relation to an inclination and displacement of the hologram disk 3. For this reason, a detection mechanism may be provided in the optical pick-up 11 to detect a displacement amount causing a small allowable error, such as inclination, displacement, etc. of the hologram disk 3, a hologram servo signal generation circuit 26 may generate a signal to be used for the servo control, and a servo mechanism may be provided in the optical information recording/reproducing apparatus 1 to correct the displacement amount through a servo control circuit 27.

On the contrary, the reflection-type optical disk optical system 11B in the optical pick-up 11 emits the signal beam to the reflection-type optical disk 4 to serve as a recording of digital information. At this time, an information signal to be recorded is generated by applying a predetermined signal processing to the digital information supplied to the microcomputer 17 from the host 2 in a reflection-type optical disk signal generation circuit 28. On the basis of the information signal, a modulated optical beam is emitted from the reflection-type optical disk optical system 11B in the optical pick-up 11 and focused on the reflection-type optical disk 4 to record the information therein.

Further, in the case of reproducing the information recorded on the optical disk, a reflected beam from the reflection-type optical disk 4 is converted to an electric signal in the reflection-type optical disk optical system 11B, and a predetermined signal processing is applied to the electric signal in a reflection-type optical disk signal processing circuit 29 to thereby obtain a reproduced signal. In this way, the reproduced signal obtained from the above is output to the host 2 via the microcomputer 17. In the recording/reproducing operation described above, the focusing (auto focus) of an optical spot on the reflection-type optical disk 4 is performed through a reflection-type optical disk servo signal generation circuit 30 and a servo control circuit 27, and the positioning (tracking) on the track (guide groove) is also performed through the circuits 30 and 27.

For a purpose of performing the foregoing recording/reproducing operation over the entire surface of reflection-type optical disk 4, the reflection-type optical disk 4 is rotated by the rotational motor 16. In this case, for a purpose of obtaining a high speed transfer rate, such as several hundreds Mbps on recording/reproducing information in and from the reflection-type optical disk 4, the microcomputer 17 controls the drive of rotational motor 16 via the disk rotational motor control circuit 20 such that the optical disk is rotated in high speed, such as several thousand revolutions per minute.

Figure 3:
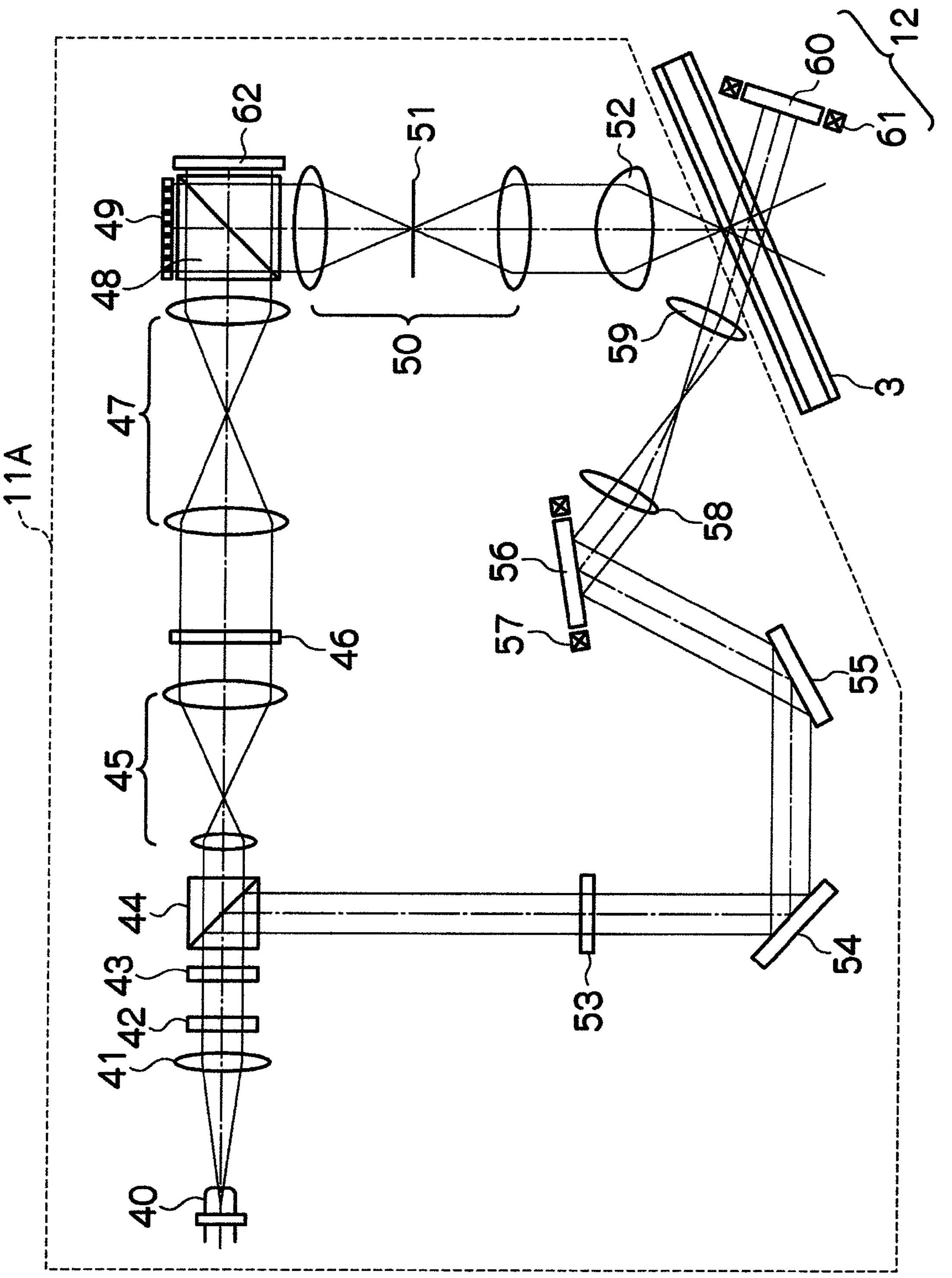
FIG. 3 is a schematic diagram showing a constitution of a hologram optical system.

FIG. 3 shows a specific constitution of the hologram optical system 11A. In the case of the hologram optical system 11A, the optical beam emitted from an optical source 40 is incident to the shutter 42 via a collimate lens 41. When the shutter 42 is open, the optical beam passes through the shutter 42, and is incident to a PBS prism 44, after a polarizing direction is controlled such that a light amount ratio of P-polarization and S-polarization becomes a desirable ratio by an optical element 43 constituted by a half-wave plate etc., for example. A diameter of the optical beam transmitted through the PBS prism 44 is enlarged by beam expanders 45, and then led into a spatial light modulator 49 via a phase mask 46, relay lenses 47 and a PBS prism 48. The spatial light modulator 49 applies a spatial light modulation to the optical beam on the basis of the information signal supplied from the hologram signal generation circuit 18 (FIG. 1). The signal beam obtained from the foregoing result is incident to an object lens 52 via a spatial filter 51 between relay lenses 50 to focus on the hologram disk 3 by the object lens 52.

The optical beam reflected by the PBS prism 44 is set to a predetermined polarizing direction by a polarizing direction converting element 53 in response to either the time of recording or reproducing, and is then incident to a galvanometer mirror 56 via mirrors 54 and 55. A reflected beam reflected as a reference beam by the galvanometer mirror 56 is therefore incident to the hologram disk 3 via a lens 58 and an object lens 59. Here, the galvanometer mirror 56 is a mirror which can be rotated by an actuator 57. In response to the rotation, an incident angle of the reference beam toward the hologram disk 3 can be set to a desirable angle.

In this way, the signal beam and reference beam are incident to the hologram disk 3 such that both the beams are overlapped with each other. An interference pattern is thereby formed on the hologram disk 3, and written in an information recording area to record information. Further, the incident angle of the reference beam to be incident to the hologram disk 3 can be changed by rotating the galvanometer mirror 52, so that it is possible to record the information by an angle multiplex recording system.

In the case of reproducing the information recorded on the hologram disk 3, the reference beam alone is incident to the hologram disk 3 by closing the shutter 42, and the optical beam transmitted through the hologram disk 3 is reflected by a galvanometer mirror 60 in the phase conjugate optical system 12, so that a phase conjugate beam can be generated. In addition, the galvanometer mirror 60 is maintained rotatably by an actuator 61. A reproduced optical beam reproduced by the phase conjugate beam is incident to the PBS prism 48 via the spatial filter 51 resided between the object lens 52 and relay lenses 50, and is reflected by the PBS prism 48 to be incident to the optical detector 62. In this way, the output of optical detector 62 is given to the hologram signal processing circuit 19 (FIG. 1) to be performed a reproducing processing.

On the contrary, FIG. 4 shows a specific constitution of the reflection-type optical disk optical system 11B. In the case of recording information on the reflection-type optical disk 4 in the reflection-type optical disk optical system 11B, an optical beam modulated on the basis of the information signal supplied from the reflection-type optical disk signal generation circuit 28 (FIG. 1) is emitted from an optical source 70, and incident to a polarizing direction converting element 72 via a collimate lens 71. The polarizing direction converting element 72 controls a polarizing direction such that the polarization of optical beam to be incident from the element becomes the S-polarization. The optical beam to be incident to a PBS prism 73 is thereby reflected, and led into a light path of a beam expander 74. Next, the optical beam passed through the beam expander 74 is incident to an object lens 77 with a circularly-polarized light formed via a mirror 75 and an optical element 76 constituted by a quarter-wave plate etc., for example, and focused by the object lens 77 on an information recording area (information recording surface) of the reflection-type optical disk 4. In this way, the information is recorded on the reflection-type optical disk 4 by the optical beam.

Further, a reflected beam of the optical beam reflected from the reflection-type optical disk 4 is transmitted through the PBS prism 73 via the object lens 77, optical element 76, mirror 75, and beam expander 74. The optical beam transmitted through the PBS prism 73 is transmitted through a collimate lens 78, then diffracted separately into a desired optical beam by a detection side diffraction grating 79 to detect an information signal, a desired servo signal, etc., and eventually focused on an optical receiving surface of an optical detector 80. In this way, the output of optical detector 80 is given to the reflection-type optical disk servo signal generation circuit 30 (FIG. 1), and a tracking error signal and a focusing error signal are generated in the reflection-type optical disk servo signal generation circuit 30 on the basis of the output from the optical detector 80. On the basis of the tracking error signal and focusing error signal, the tracking control and focusing control are performed through the servo control circuit 27 under the control of microcomputer 17.

Furthermore, in the case of reproducing the information recorded on the reflection-type optical disk 4, a certain optical source drive current is supplied from the optical source drive circuit 24 under the control of microcomputer 17 to emit an optical beam having a certain power from the optical source 70. The optical beam is focused on an information recording surface of the reflection-type optical disk 4, similarly to the foregoing recording operation, and a reflected beam of the optical beam is incident to the optical detector 80, also similarly to the foregoing recording operation. The output of optical detector 80 is then given to the reflection-type optical disk signal processing circuit 29 (FIG. 1) to perform the reproducing processing therein. Further, the output of optical detector 80 is also given to the reflection-type optical disk servo signal generation circuit 30. In this way, the tracking control and focusing control are performed on the basis of the output of optical detector 80, similarly to the foregoing recording operation.

As described above, the optical pick-up 11 changes over (selects) whether the optical beam is emitted from the optical source 40 or from the optical source 70, so that the information can be recorded and reproduced in and from the hologram disk 3 or reflection-type optical disk 4.

Figure 5:
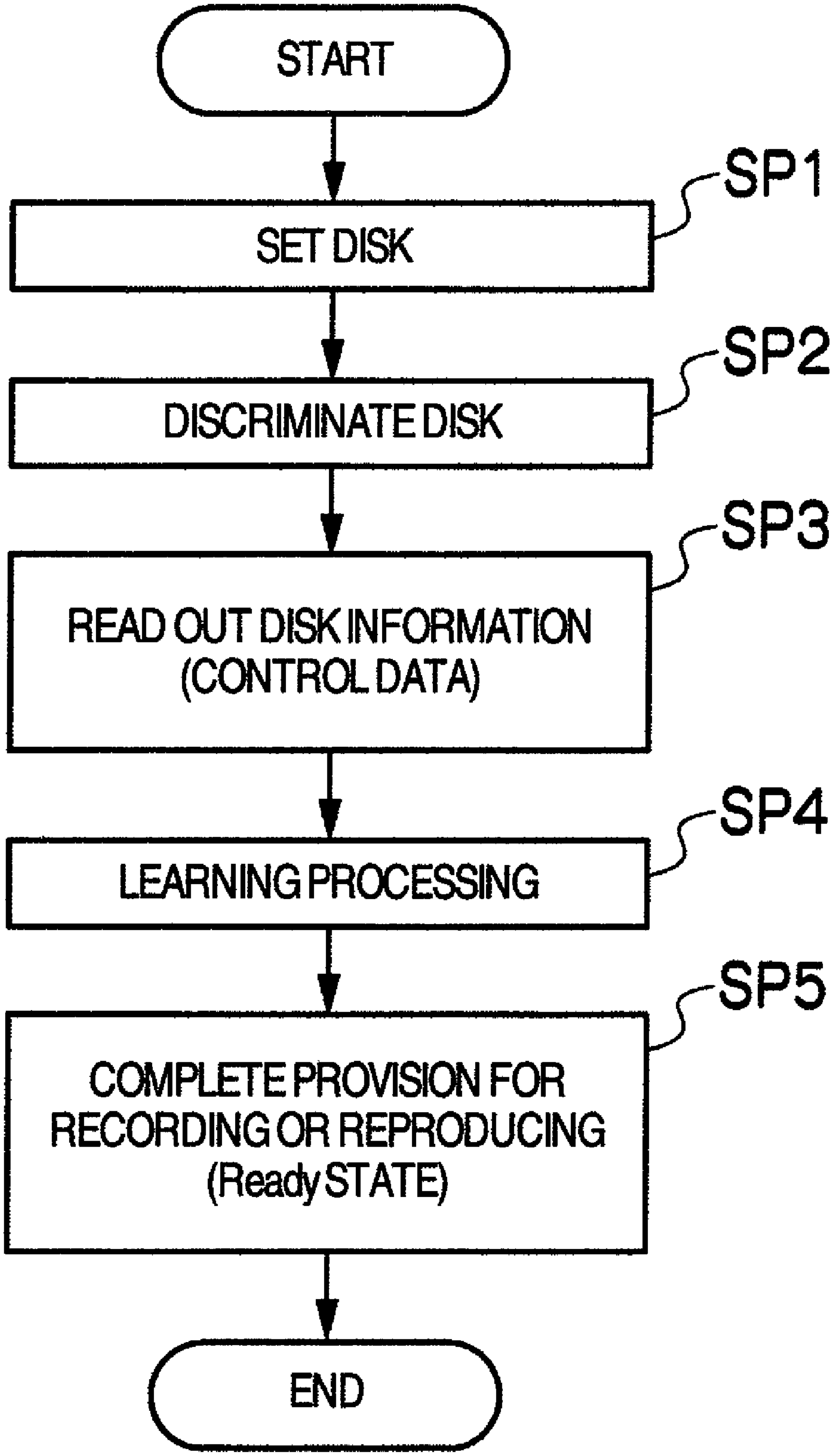
FIG. 5 is a flowchart for explaining a recording/reproducing provision processing in the optical information recording/reproducing apparatus.
Figure 6:
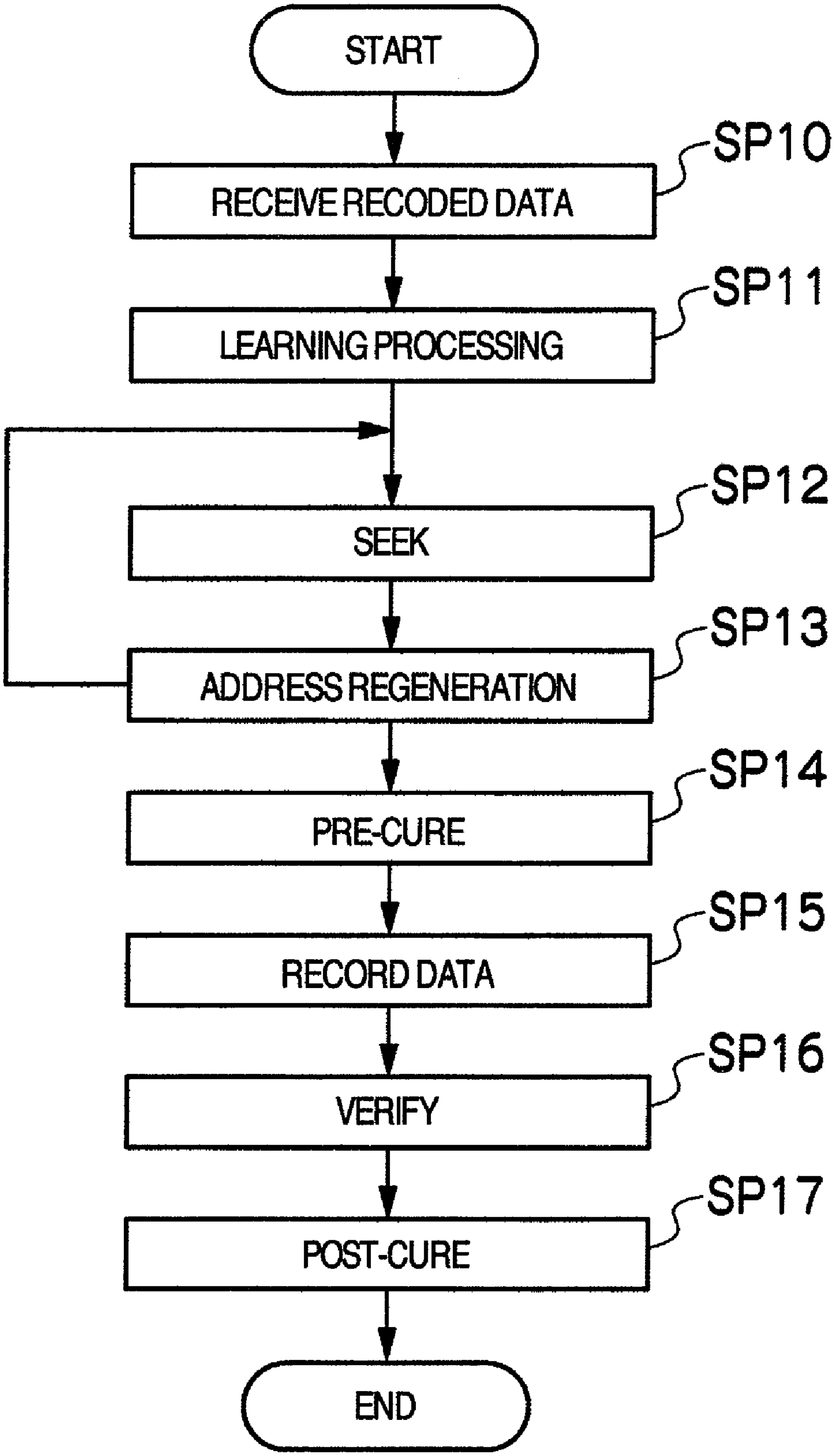
FIG. 6 is a flowchart for explaining a recording processing in the optical information recording/reproducing apparatus.
Figure 7:
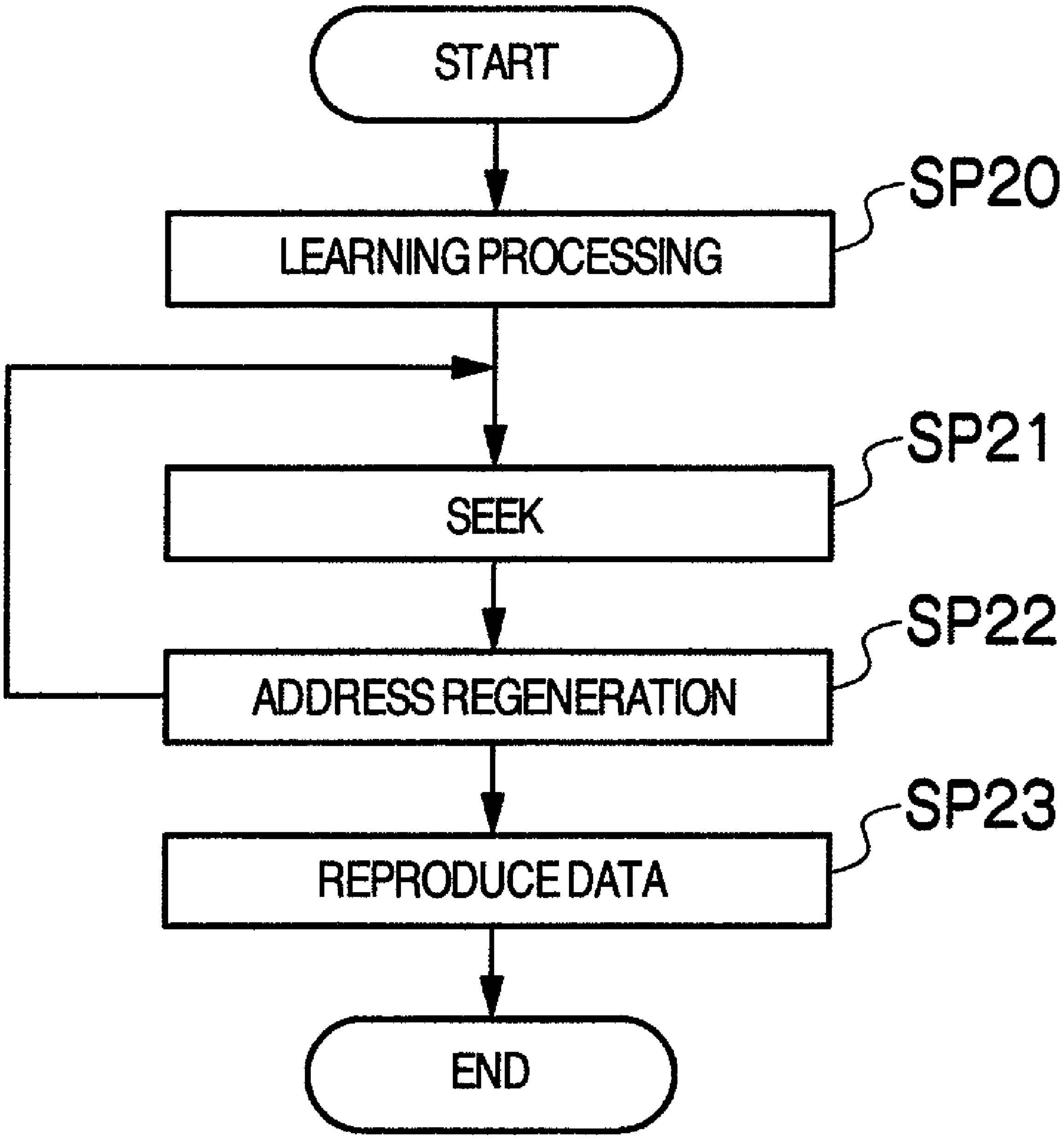
FIG. 7 is a flowchart for explaining a reproducing processing in the optical information recording/reproducing apparatus.

FIG. 5 to FIG. 7 show recording/reproducing operation flows in the optical information recording/reproducing apparatus 1. Here, an operation associated with the recording and reproducing relative to the hologram disk 3 will specifically described below.

FIG. 5 shows a recording/reproducing provision processing flow from when the optical disk is set into the optical information recording/reproducing apparatus 1 to when a recording or reproducing provision is completed. FIG. 6 shows a recording processing flow from when a provision completed condition to when information is recorded on the optical disk. FIG. 7 shows a reproducing processing flow from when the provision completed condition to when the information recorded on the optical disk is reproduced.

As shown in FIG. 5, the optical disk is set to the apparatus (step SP1). The optical information recording/reproducing apparatus 1 discriminates the setting optical disk whether it is used for an optical disk (hologram disk 3) for recording or reproducing digital information by using the holography (step SP2).

From a result of the disk discrimination, if the process discriminates that the setting optical disk is the hologram disk 3, the optical information recording/reproducing apparatus 1 reads out control data provided on the hologram disk 3 to obtain information relative to the optical disk and information relative to various setting conditions at a time of the recording or reproducing (step SP3).

The optical information recording/reproducing apparatus 1 completes the reading of the control data to perform various adjustments in response to the control data and a learning processing relative to the optical pick-up 11 (step SP4), and the provision for the recording or reproducing is completed (step SP5).

The operation flow from the provision completed condition to the recording of information is shown in FIG. 6. That is, the optical information recording/reproducing apparatus 1 receives data to be recorded to then send information corresponding to the data to the foregoing spatial light modulator 49 of the hologram optical system 11A (FIG. 3) in the optical pick-up 11 (step SP10).

After that, the optical information recording/reproducing apparatus 1 performs the various learning processings in advance, as required, to be able to record high quality information in the hologram disk 3 (step SP11), and allocates positions of the optical pick-up 11 and disk-cure optical system 13 to predetermined positions of the hologram disk 3 while repeating a seeking operation and an address regeneration (steps SP12 and SP13).

Subsequently, the optical information recording/reproducing apparatus 1 performs a pre-cure processing to apply a pre-cure to a predetermined area by using the optical beam emitted from the disk-cure optical system 13 (step SP14), after that, records the data by using the reference beam and signal beam emitted from the hologram optical system 11A in the optical pick-up 11 (step SP15).

After recording the data, the optical information recording/reproducing apparatus 1 verifies the data, as required (step SP16), and performs a post-cure processing to apply a post-cure to the data recording area by using the optical beam emitted from the disk-cure optical system 13 (step SP17).

The operation flow from the provision completed condition to the reproducing of information is shown in FIG. 7. That is, the optical information recording/reproducing apparatus 1 performs the various learning processings, as required, to be able to reproduce the high quality information from the hologram disk 3 (step SP20). After that, the optical information recording/reproducing apparatus 1 allocates positions of the optical pick-up 11 and phase conjugate optical system 12 to predetermined positions of the hologram disk 3 while repeating the seeking operation and the address regeneration (steps SP21 and SP22).

The optical information recording/reproducing apparatus 1 then makes the hologram optical system 11A in the optical pick-up 11 emit the reference beam, and reads out the information recorded on the hologram disk 3 (step SP23).

(2-1) Disk Distinction Method in the Embodiment;

Next, a specific method of a disk distinction processing to be performed at the step SP2 in FIG. 5 will be described below.

Figure 8A:
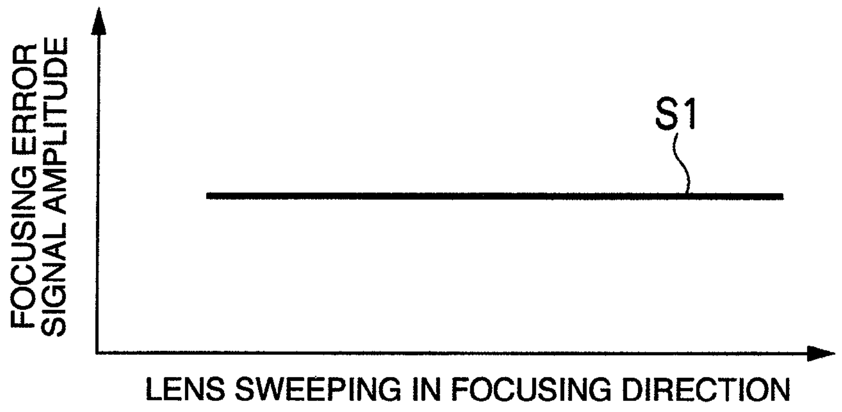
FIG. 8A is a waveform chart showing an amplitude variation of a focusing error signal on sweeping a focusing position when an optical disk is not mounted on the apparatus.
Figure 8B:
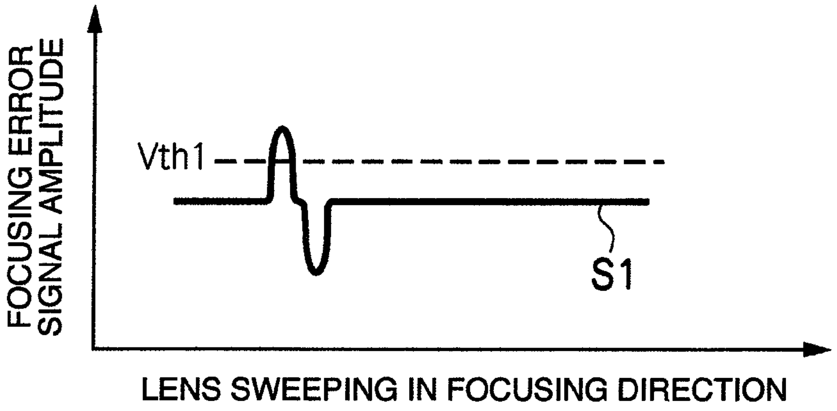
FIG. 8B is a waveform chart showing the amplitude variation of the focusing error signal on sweeping the focusing position when a hologram disk is mounted on the apparatus.
Figure 8C:
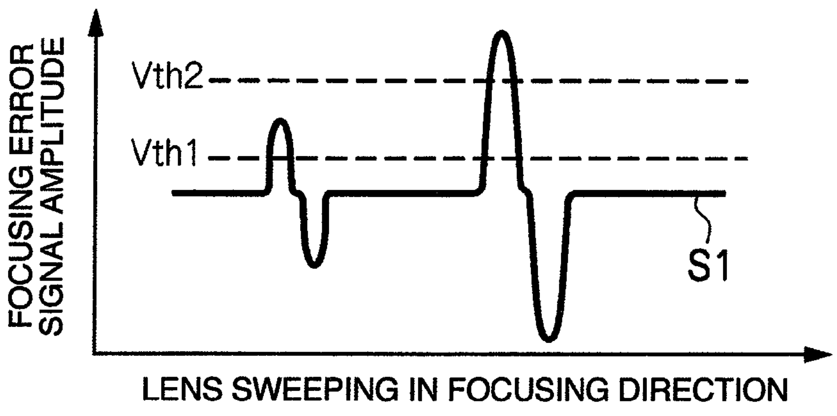
FIG. 8C is a waveform chart showing the amplitude variation of the focusing error signal on sweeping the focusing position when a reflection-type optical disk is mounted on the apparatus.

FIGS. 8A to 8C show amplitude variations of a focusing error signal S1. This focusing error signal is generated by the rotation angle detecting servo signal generation circuit 21 on the basis of a reflected beam of the optical beam reflected from the optical disk, by emitting the optical beam to the optical disk from the disk rotation angle detecting optical pick-up 14 while an object lens (not shown) on the pick-up 14 is moved in an axial direction of the optical disk.

In this case, when the optical disk is not mounted on the optical information recording/reproducing apparatus 1, the amplitude of focusing error signal S1 is always maintained at a constant value "0" since the optical beam emitted from the disk rotation angle detecting optical pick-up 14 is not reflected from the optical disk. Further, when the hologram disk 3 is mounted on the optical information recording/reproducing apparatus 1, the amplitude of focusing error signal S1 is varied slightly by the reflected beam as shown in FIG. 8B, since the optical beam is reflected from the surface of hologram disk 3.

Therefore, a threshold value (hereinafter, this is referred to as a first threshold value voltage Vth1) is set between the signal level of focusing error signal S1 in FIG. 8A and the peak level of focusing error signal S1 in FIG. 8B. It is judged whether the variation of focusing error signal S1 is greater than the first threshold value voltage Vth1 in the case where the optical beam is emitted from the disk rotation angle detecting optical pick-up 14, while the focusing position is changed toward the optical disk as described above, so that it can be judged whether the optical disk is mounted on the optical information recording/reproducing apparatus 1.

On the other hand, when the reflection-type optical disk 4 is mounted on the optical information recording/reproducing apparatus 1, the amplitude of focusing error signal S1 is varied by the reflected beam, as shown in FIG. 8C, since the optical beam emitted from the disk rotation angle detecting optical pick-up 14 is reflected from the surface of the reflection-type optical disk 4 and the reflection layer thereof. In this case, since the optical beam is reflected from the reflection layer much more than from the surface of reflection-type optical disk 4, the amplitude of focusing error signal S1 becomes greater than the variation (the left side variation in FIG. 8C) caused by the reflected beam from the surface of reflection-type optical disk 4 than the variation (the right side variation in FIG. 8C) caused by the reflected beam from the reflection layer.

Therefore, a threshold value (hereinafter, this is referred to as a second threshold value voltage Vth2) is set between the peak level of focusing error signal S1 on the basis of the reflected beam from the surface of reflection-type optical disk 4 and the peak level of focusing error signal S1 on the basis of the reflected beam from the reflection layer of the existing-type disk 4. It is then judged whether the variation of focusing error signal S1 is greater than the second threshold value voltage Vth2 in the case where the optical beam is emitted from the disk rotation angle detecting optical pick-up 14, while the focusing position is changed toward the optical disk, so that it is judged whether the mounting optical disk on the optical information recording/reproducing apparatus 1 is the hologram disk 3.

Consequently, in the optical information recording/reproducing apparatus 1 of the embodiment, it is judged whether the signal level of focusing error signal S1 is greater than the foregoing first threshold value voltage Vth1 or second threshold value voltage Vth2, as shown in FIGS. 8A to 8C, in the reflection-type optical disk detection circuit 23, on the basis of the focusing error signal S1 generated in the rotation angle detecting servo signal generation circuit 21, so that it can be judged whether the optical disk is mounted, and judged whether the optical disk is the hologram disk 3 or reflection-type optical disk 4, when the optical disk is mounted on the apparatus.

Figure 9:
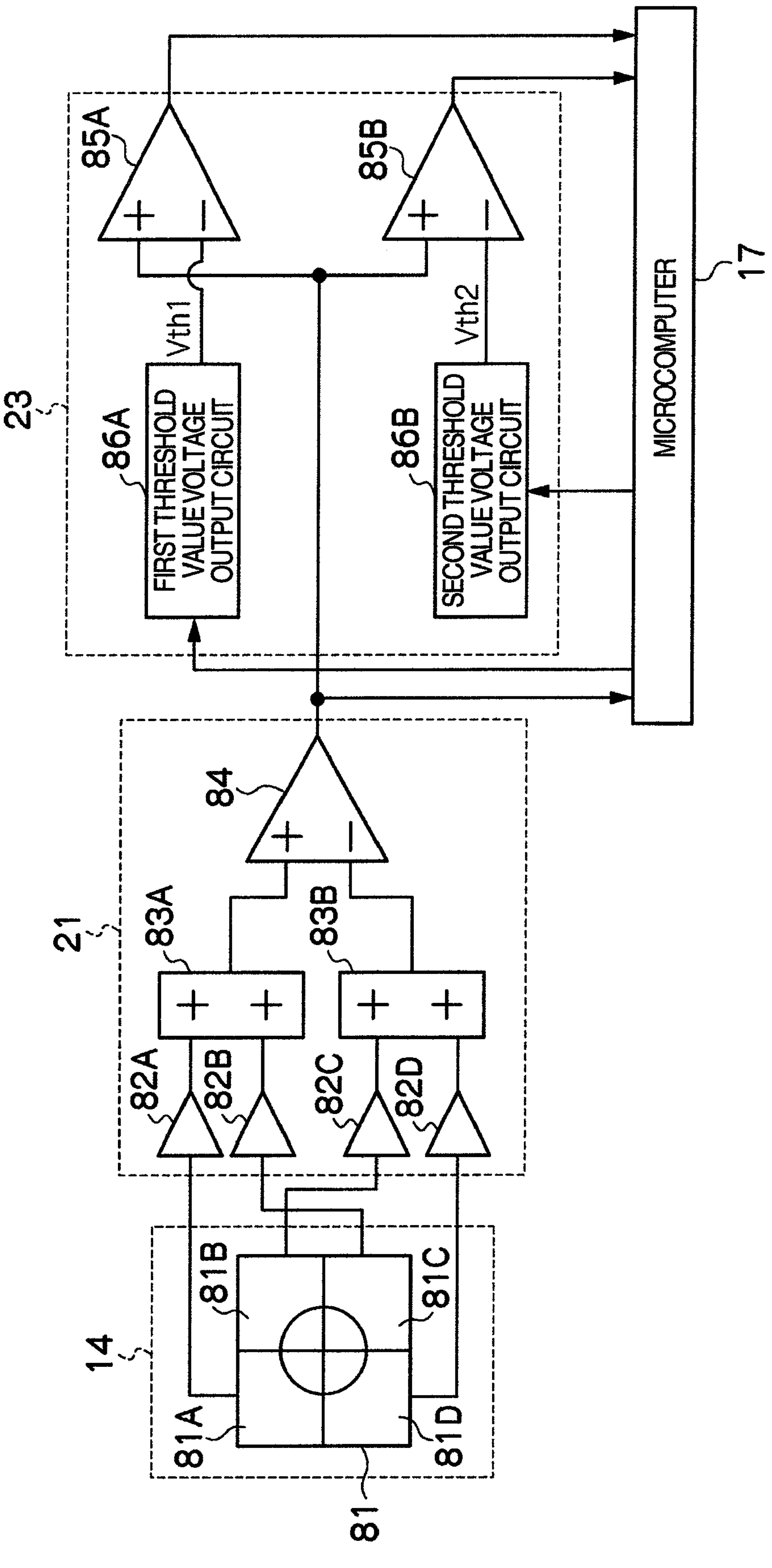
FIG. 9 is a block diagram showing a specific constitution of a reflection-type optical disk detection circuit.

FIG. 9 shows a specific constitution of the reflection-type disk detection circuit 23 having the foregoing function. As is apparent from FIG. 9, outputs from a first optical receiving area 81A and a third optical receiving area 81C in a four-segmented optical detector 81 provided in the disk rotation angle detecting optical pick-up 14, are given to a first adding circuit 83A via a first IV amplifier 82A and a third IV amplifier 82C provided in the rotation angle detecting servo signal generation circuit 21, and is added therein to be given as a first added signal to a positive input terminal of a subtracting circuit 84. Further, outputs from a second light receiving area 81B and a fourth light receiving area 81D in the four-segmented light detector 81, are given to a second adding circuit 83B via a second IV amplifier 82B and a fourth IV amplifier 82D provided respectively in the rotation angle detecting servo signal generation circuit 21, and is added therein to be given as a second added signal to a negative input terminal of the subtracting circuit 84.

The subtracting circuit 84 subtracts the second added signal from the first added signal to obtain a focusing error signal and send it to the microcomputer 17. In this way, the microcomputer 17 controls the disk rotation angle detecting optical pick-up 14 via the rotation angle detecting servo control circuit 22 on the basis of the focusing error signal, such that the optical beam emitted from the disk rotation angle detecting optical pick-up 14 is focused correctly on the optical disk, as described above.

Further, the focusing error signal output from the subtracting circuit 84 is also given to positive input terminals of a first subtracting circuit 85A and a second subtracting circuit 85B in the reflection-type disk detection circuit 23. The foregoing first threshold value voltage Vth1 is then given to a negative input terminal of the first subtracting circuit 85A from a first threshold value voltage output circuit 86A under the control of microcomputer 17 on the disk distinction processing at the step SP2 in FIG. 5. In this way, the first subtracting circuit 85A subtracts the first threshold value voltage Vth1 from the signal level of the focusing error signal to output a difference voltage between the focusing error signal and the first threshold value voltage Vth1, as a first judged signal, to the microcomputer 17.

Likewise, the foregoing second threshold value voltage Vth2 is given to a negative input terminal of the second subtracting circuit 85B from a second threshold value voltage output circuit 86B under the control of microcomputer 17 on the disk distinction processing at the step SP2 in FIG. 5. In this way, a second subtracting circuit 84B subtracts the second threshold value voltage Vth2 from the signal level of the focusing error signal to output a difference voltage between the focusing error signal and the second threshold value voltage Vth2, as a second judged signal, to the microcomputer 17.

The microcomputer 17 then judges whether the optical disk is mounted, and whether the optical disk is the hologram disk 3 or reflection-type optical disk 4 in the case where the optical disk is mounted, on the basis of the first and second judged signals given from the reflection-type disk detection circuit 23. Further, the microcomputer 17 performs various setting processings on the basis of judged results.

Figure 10:
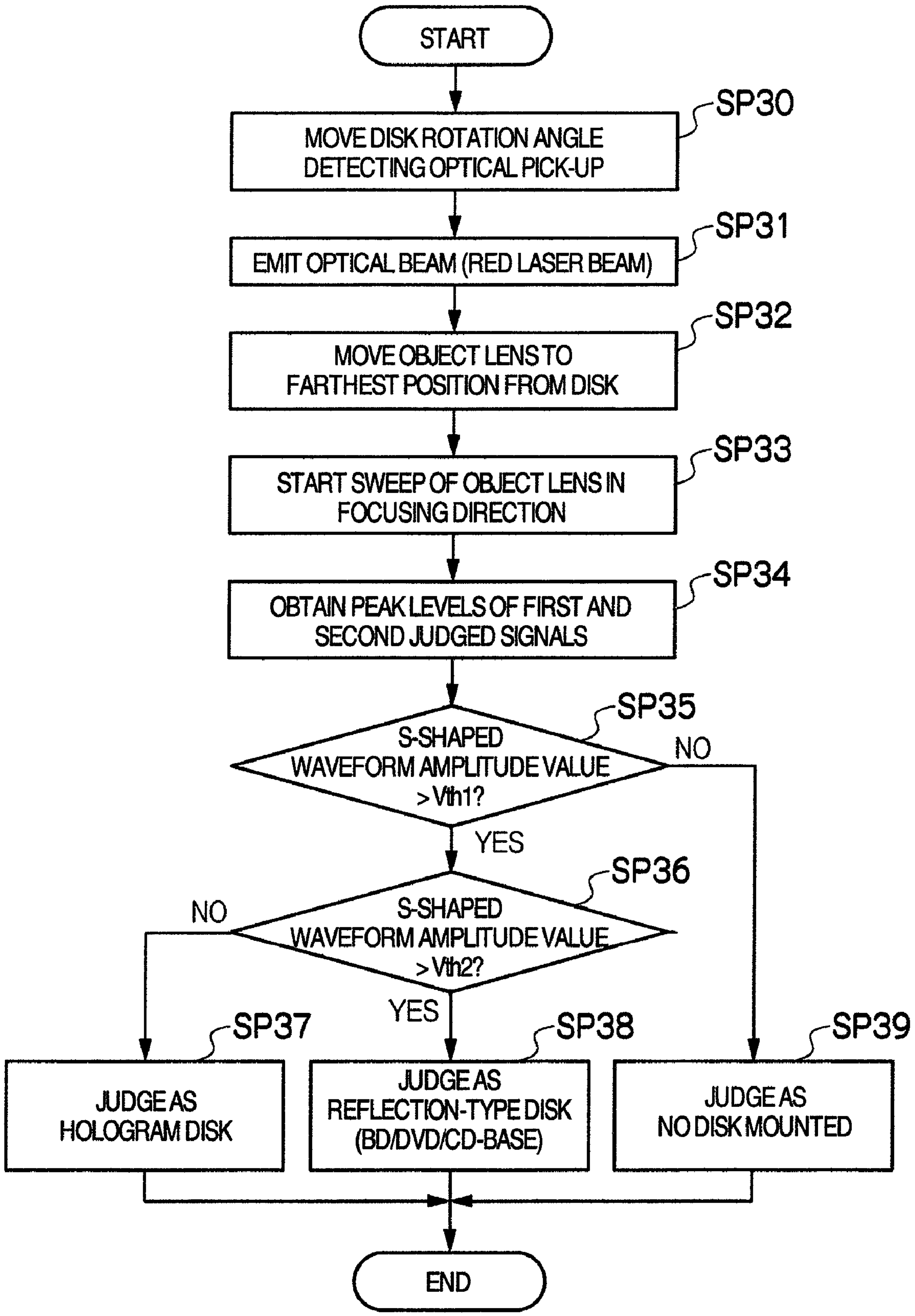
FIG. 10 is a flowchart showing specific processing contents of a disk distinction processing to be executed by a microcomputer in the first embodiment.

FIG. 10 is a flowchart showing specific processing contents of the microcomputer 17 in relation to the foregoing disk distinction processing. The microcomputer 17 executes the disk distinction processing shown in FIG. 10 on the basis of a control program stored in an internal memory (not shown).

That is, the microcomputer 17 executes the step SP2 of the foregoing recording/reproducing provision processing in FIG. 5 to then start the disk distinction processing. First, the disk rotation angle detecting optical pick-up 14 is moved up to a position where it is faced to a predetermined position on the optical disk in the case where the optical disk is mounted on the apparatus, by driving a slide mechanism (not shown) used for the disk rotation angle detecting optical pick-up 14 (step SP30).

Subsequently, the microcomputer 17 controls the optical source drive circuit 24 (FIG. 1) to supply a power source drive current to the optical source in the disk rotation angle detecting optical pick-up 14 and emit the optical beam (red optical beam) from the pick-up 14 (step SP31).

After that, the microcomputer 17 drives a biaxial actuator (not shown) which holds an object lens (not shown) in the disk rotation angle detecting optical pick-up 14 to make the object lens move to the farthest position from the optical disk, in the case where the optical disk is mounted on the apparatus (step SP32).

The microcomputer 17 then drives the biaxial actuator to start the movement of the object lens in the focusing direction (step SP33), and then obtains peak values of the respective signal levels of the first and second judged signals given from the reflection-type disk detection circuit 23 (step SP34).

Subsequently, the microcomputer 17 judges whether the peak value of the focusing error signal exceeds the first threshold value voltage Vth1 on the basis of the peak value of the first judged signal obtained at the step SP34 (step SP35). The microcomputer 17 then obtains a negation result from the judgment at the step SP35 to judge that the optical disk is not mounted on the apparatus (step SP39), and the disk distinction processing is completed.

On the other hand, the microcomputer 17 obtains an affirmation result in the judgment at the step SP35 to judge whether the peak value of the focusing error signal exceeds the second threshold value voltage Vth2 (whether the peak value of the second judged signal is a positive value), on the basis of the peak value of second judged signal obtained at the step SP34 (step SP36).

The microcomputer 17 obtains the negation result at the step SP36 to judge that the mounting optical disk is the hologram disk 3 (step SP37). In contrast, the microcomputer 17 obtains the affirmation result to judge that the mounting optical disk is the reflection-type optical disk 4 (step SP38), and the disk distinction processing is then completed.

(1-3) Advantages of the Embodiment

As described above, in the case of the optical information recording/reproducing apparatus 1, a user can use the optical information recording/reproducing apparatus 1 without regard to the type of optical disk mounting on the apparatus 1 since the optical beam is irradiated on the optical disk, and the type (hologram disk 3 or reflection-type optical disk 4) of optical disk being mounted is discriminated on the basis of a reflected beam. This enables the optical information recording/reproducing apparatus 1 to enhance usability.

(2) Second Embodiment

Figure 11:
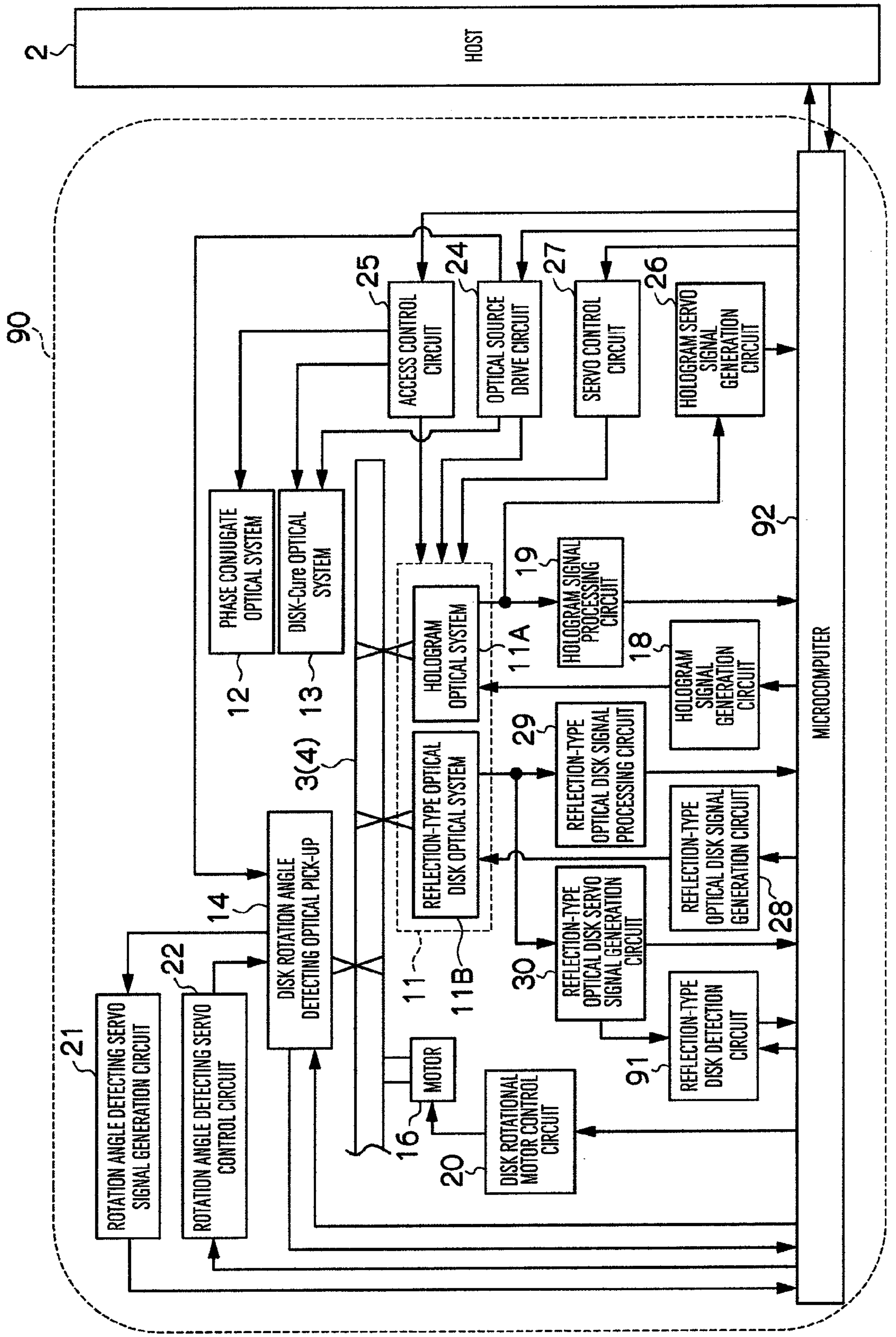
FIG. 11 is a block diagram showing a constitution of the optical information recording/reproducing apparatus in a second embodiment.

FIG. 11 shows a constitution of an optical information recording/reproducing apparatus 90 in a second embodiment, and the same element shown in FIG. 1 is indicated by the same reference numeral in FIG. 11. The optical information recording/reproducing apparatus 90 does not use the optical beam, used for the disk rotation angle detection, emitted from the disk rotation angle detecting optical pick-up 14, but uses the optical beam (red optical beam), used for recording/reproducing information in and from CD, emitted from the reflection-type optical disk optical system 11B in the optical pick-up 11. The foregoing constitution is the same as the optical information recording/reproducing apparatus 1 in the first embodiment, except for the distinction of whether the mounting optical disk is the hologram disk 3.

Practically, in the case of optical information recording/reproducing apparatus 90, the focusing error signal generated in the reflection-type optical disk servo signal generation circuit 30 is given to a reflection-type optical disk detection circuit 91. The detection circuit 91 has the same constitution as the reflection-type disk detection circuit 23 (FIG. 1) in the first embodiment, and sends the same first and second judged signals in the first embodiment to a microcomputer 92.

The microcomputer 92 judges whether the optical disk is mounted on the apparatus, and whether the mounting optical disk is the hologram disk 3 in the case where the optical disk is mounted, on the basis of the first and second judged signals given from the reflection-type optical disk detection circuit 91. In addition, a description for processing steps of the disk distinction processing by the microcomputer 92 on the basis of the first and second judged signals is omitted since it is the same as the foregoing disk distinction processing in FIG. 10.

As described above, in the case of optical information recording/reproducing apparatus 90 in the embodiment, the user can use the optical information recording/reproducing apparatus 90 without regard to the type of optical disk mounting on the apparatus 1, similarly to the first embodiment, since the type of optical disk is discriminated by using the red optical beam for recording/reproducing information in and from CD. This enables the optical information recording/reproducing apparatus 90 to enhance usability.

(3) Third Embodiment

Figure 12:
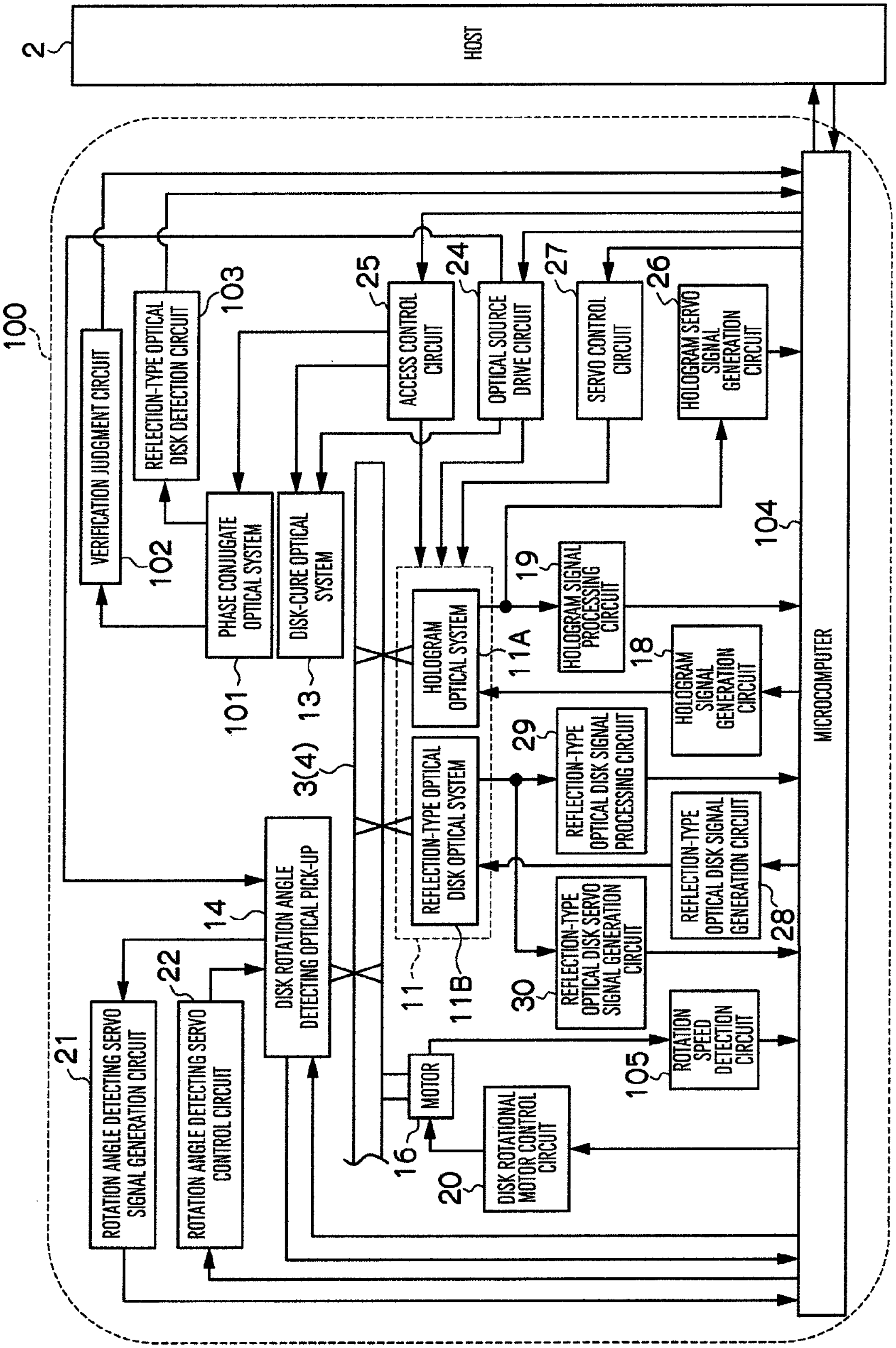
FIG. 12 is a block diagram showing a constitution of the optical information recording/reproducing apparatus in a third embodiment.

FIG. 12 shows a constitution of an optical information recording/reproducing apparatus 100 in a third embodiment, and the same element shown in FIG. 1 is indicated by the same reference numeral in FIG. 12. The optical information recording/reproducing apparatus 100 has the same constitution as the optical information recording/reproducing apparatus 1 in the first embodiment, except that the type of optical disk is discriminated on the basis of a transmitted beam through the optical disk, and that it is judged whether the optical disk is present or absent on the basis of a stationary rotation speed of the rotational motor 16.

That is, in the case of the first and second embodiments, it is judged whether the optical disk is present or absent on the apparatus by irradiating the optical beam on the optical disk and on the basis of a light amount of the reflected beam from the optical disk. Besides, the type of optical disk is discriminated when the optical disk is mounted on the apparatus.

However, in consideration of the hologram disk 3 which is an optically transmitted type optical disk without having a reflection layer and the reflection-type optical disk 4, such as CD, DVD, BD, etc., which is a reflection-type optical disk 4 with the reflection layer, the optical disk through which the optical beam is transmitted can be discriminated to the hologram disk 3, and the optical beam is not transmitted can be discriminated to the reflection-type optical disk 4.

Consequently, in the case of the optical information recording/reproducing apparatus 100 in the embodiment, the reference beam is irradiated on the optical disk from the hologram optical system 11A at the step SP2 in FIG. 5, the transmitted beam thereof is received by a phase conjugate optical system 101, and it is then judged whether the mounting optical disk is the hologram disk 3 on the basis of a received light amount of the transmitted beam.

Figure 13:
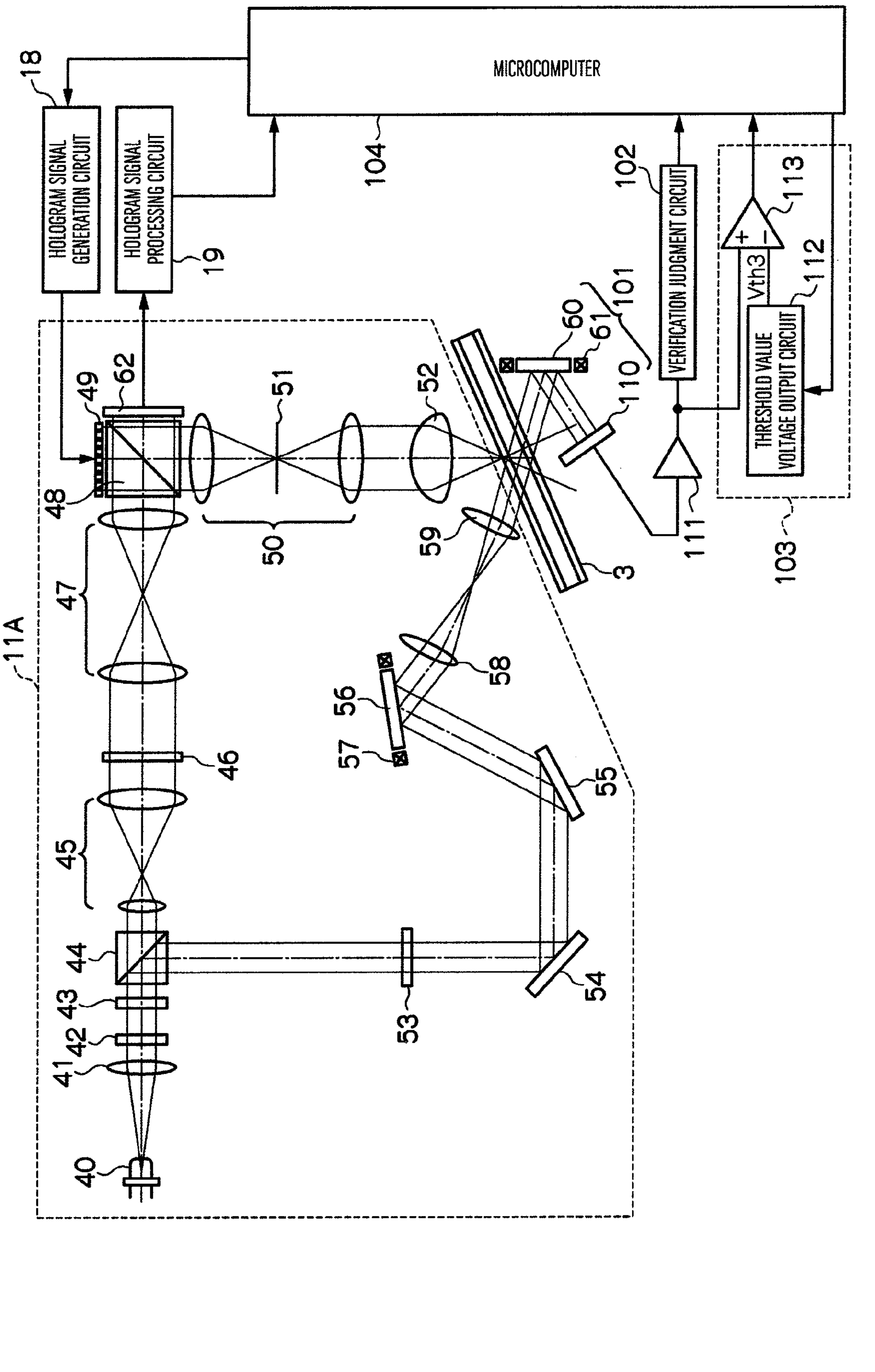
FIG. 13 is a schematic diagram showing a specific constitution of a phase conjugate optical system and reflection-type optical disk detection circuit in the third embodiment.

FIG. 13 shows a specific constitution of a part associated with the disk distinction function in the optical information recording/reproducing apparatus in the embodiment, and the same element shown in FIG. 3 is indicated by the same reference numeral in FIG. 13. In this case, the phase conjugate optical system 101 in the optical information recording/reproducing apparatus 100 provides with a reflection-type optical disk detection circuit 103 in addition to a verification judgment circuit 102 for performing the foregoing verification at the step SP16 in FIG. 6.

An optical detector 110 in the phase conjugate optical system 101 receives the reference beam transmitted through the optical disk, among the reference beams emitted from the hologram optical system 11A on the disk distinction processing at the step SP2 in FIG. 5. At this time, the output of optical detector 110, as a received signal, is sent to the reflection-type optical disk detection circuit 103 via an IV amplifier 111.

The reflection-type optical disk detection circuit 103 is constituted by a threshold value voltage output circuit 112 and a subtracting circuit 113 to supply the received signal given from the phase conjugate optical system 103 to a positive side input terminal of the subtracting circuit 113. On the disk distinction processing, the threshold value voltage output circuit 112 outputs, to a negative side input terminal of the subtracting circuit 113, a predetermined voltage (hereinafter, this voltage is referred to as threshold value voltage Vth3) which is lower than the signal level of received signal output from the optical detector 110 receiving the reference beam transmitted through the hologram disk 3, and higher than the signal level of received signal output from the optical detector 110 when the reference beam is blocked by the reflection-type optical disk 4, under control of a microcomputer 104.

In this way, the subtracting circuit 113 subtracts the threshold value voltage Vth3 from the output voltage of optical detector 110 to send a subtracted result, as a discriminated signal, to the microcomputer 104. The microcomputer 104 then judges whether the mounting optical disk is the hologram disk 3 on the basis of the discriminated signal given from the subtracting circuit 113.

In addition, when the type of optical disk is discriminated on the basis of the transmitted beam through the optical disk as described above, it is required to pay attention to the optical disk position on which the reference beam is irradiated such that the reference beam irradiated on the optical disk is adversely affected to the information recorded on the hologram disk 3.

Figure 14:
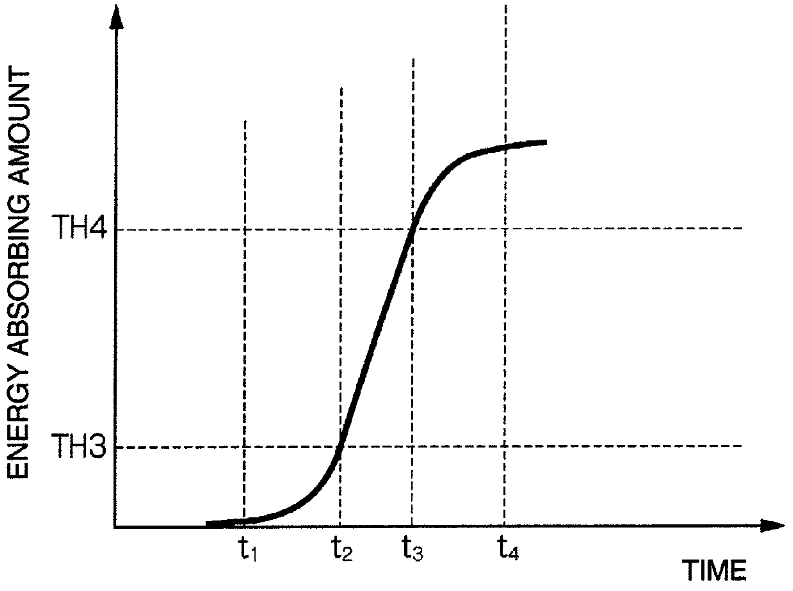
FIG. 14 is a characteristic curve chart for explaining an energy absorbing characteristic of a photopolymer.

That is, a photopolymer constituting a recording layer of the hologram disk 3 has a characteristic indicating that it hardly absorbs an energy at an initial condition (information is hardly recorded), and it becomes a condition where the energy is easily absorbed after absorbing to some extent of the energy (information is easily recorded), but it becomes a condition where the energy is hardly absorbed after absorbing a predetermined amount of the energy, as shown in FIG. 14.

Consequently, when information is recorded on the hologram disk 3 in general, the pre-cure processing (the step SP14 in FIG. 6, and time t1 to time t2 in FIG. 14) is applied to an area portion on which the information is recorded in the hologram disk 3. After the recording of the information is completed, the post-cure processing (time t3 to time t4 in FIG. 14) is applied to the area portion to place the information firmly thereon. Referring to FIG. 14, TH3 denotes an energy threshold value to be given to the area portion on which the information is recorded on the pre-cure processing, and TH4 denotes an energy threshold value to be given to the area portion on which the information is recorded on the post-cure processing.

Therefore, when the type of optical disk is discriminated on the basis of the transmitted beam through the optical disk, it is necessary to select a non-recorded area before which the pre-cure processing is applied, or an area after which the post-cure processing is applied.

Consequently, in the embodiment, a disk distinction-purposed area including the non-recorded area which is not used for recording information before the pre-cure processing and a ROM area after the post-cure processing, is provided on a predetermined radial position of the hologram disk 3 in advance. In this way, the reference beam is irradiated on the disk distinction-purposed area on the disk distinction processing to discriminate the type of optical disk.

Figure 15A:
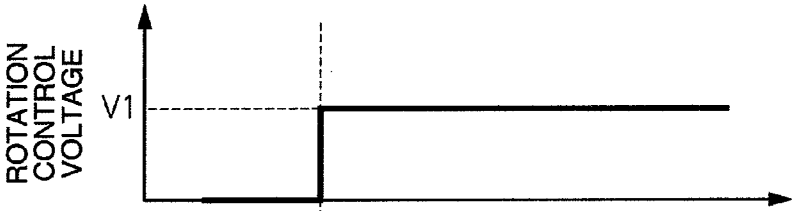
FIG. 15A is a waveform chart showing a rotation control voltage.
Figure 15B:
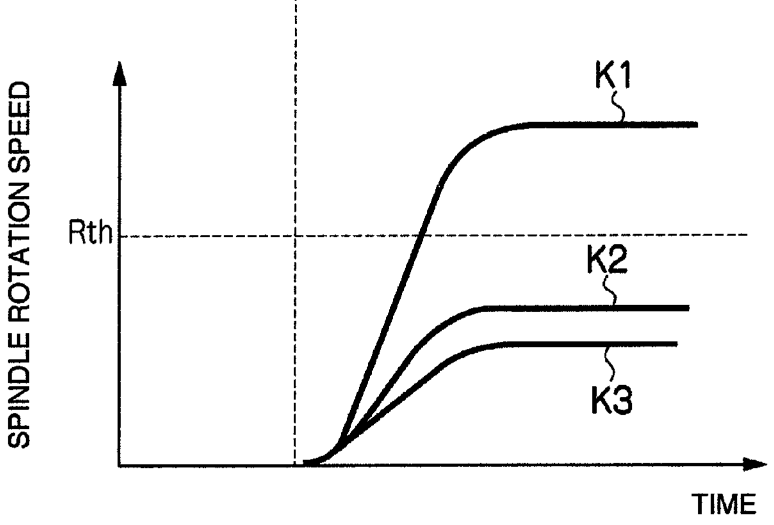
FIG. 15B is a characteristic curve chart showing a rotation speed of a rotational motor in the case where the optical disk is mounted and not mounted.

On one hand, in the case where a certain drive voltage V1 as shown in FIG. 15A is applied to the rotational motor 16 for example in the optical information recording/reproducing apparatus 1, the rotation speed of rotational motor 16 varies as indicated by a curve K1 in FIG. 15B when the optical disk is not mounted on the apparatus. On the other hand, when the optical disk is mounted on the apparatus, the rotation speed of rotational motor 16 decreases by causing an amount of weight as indicated by curves K2 and K3 in FIG. 15B, compared with a condition where the optical disk is not mounted. In addition, one of the curves K2 and K3 is a rotation characteristic of the rotational motor 16 in the case of mounting the hologram disk 3 and the other thereof is a rotation characteristic in the case of mounting the reflection-type optical disk 4.

In the case of optical information recording/reproducing apparatus 100 in the embodiment, it is judged whether the optical disk is mounted on the apparatus on the basis of the rotation speed of rotational motor 16 on the disk distinction processing executed at the step SP2 in FIG. 5.

Specifically, as shown in FIG. 12, in the case of optical information recording/reproducing apparatus 100, a high-frequency generator (not shown), such as a rotary encoder to output a pulse in response to a rotating condition of the rotational motor 16, is fitted on the rotational motor 16 to give an output from the high-frequency generator to a rotation speed detection circuit 105. The detection circuit 105 then detects the rotation speed of rotational motor 16 on the basis of the output of high-frequency generator to send a detected result as a rotation speed detected signal to the microcomputer 104.

At this time, the microcomputer 104 has a predetermined value (hereinafter, this value referred to as a rotation speed threshold value) Rth, in advance, which is smaller than the stationary rotation speed of rotational motor 16 when the optical disk having a previously set rotation speed of the rotational motor 16 is not mounted, and larger than the stationary rotation speed thereof when the optical disk is mounted. The microcomputer 104 then compares the rotation speed of rotational motor 16 recognized on the basis of the rotation speed detected signal give from the rotation speed detection circuit 105 with the rotation speed threshold value to thereby judge whether the optical disk is mounted.

Figure 16:
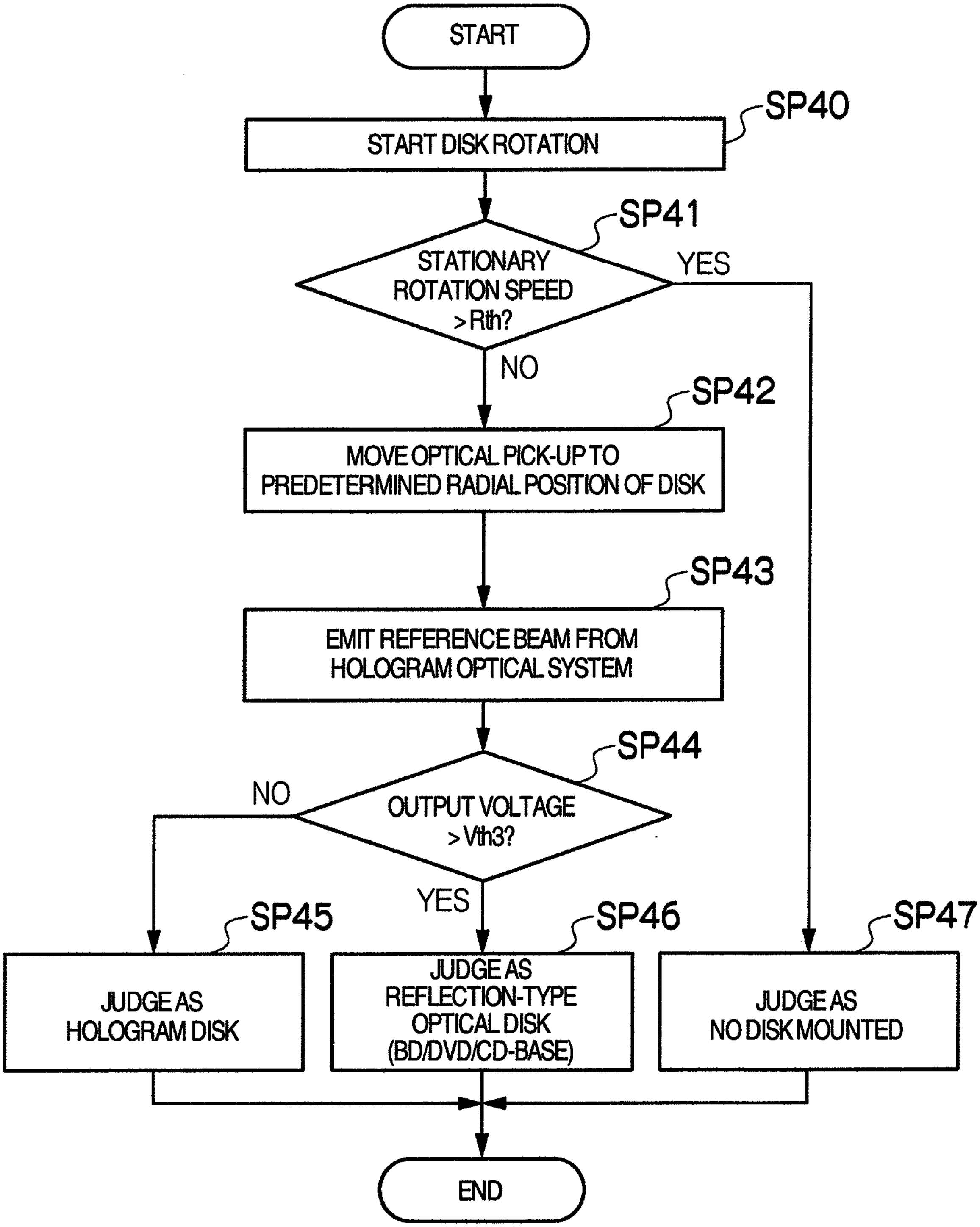
FIG. 16 is a flowchart showing specific processing contents of the disk distinction processing to be executed by the microcomputer in the third embodiment.

FIG. 16 is a flowchart showing specific processing contents relative to the disk distinction processing executed by the microcomputer 104. The microcomputer 104 performs the disk distinction processing shown in FIG. 16 on the basis of a control program stored in an internal memory (not shown).

That is, the microcomputer 104 starts the disk distinction processing when the foregoing recording/reproducing provision processing progresses at the step SP2 in FIG. 5. First, the disk rotational motor control circuit 20 is controlled to drive the rotational motor 16 by a predetermined voltage (step SP40). After that, it is judged whether the stationary rotation speed of rotational motor 16 is greater than the previously set foregoing rotation speed threshold value Rth, on the basis of the rotation speed detected signal given from the rotation speed detection circuit 105 (step SP41).

The microcomputer 104 then obtains an affirmation result from the step SP41 to thereby judge that the optical disk is not mounted on the apparatus (step SP47), and the disk distinction processing is completed.

On the contrary, the microcomputer 104 obtains a negation result by the judgment at the step SP41 to move the optical pick-up 11 to a predetermined radial position of the optical disk by driving a slide mechanism (not shown) (step SP42). After that, the optical source drive circuit 24 (FIG. 12) is controlled to drive the optical source 40 (FIG. 13) on the hologram optical system 11A in the optical pick-up 11, so that the reference beam is irradiated on the disk distinction-purposed area of the optical disk (step SP43).

Subsequently, the microcomputer 104 judges whether the output voltage from optical detector 110 is greater than the threshold value voltage Vth3 output from the threshold value voltage output circuit 112 in the reflection-type optical disk detection circuit 103, on the basis of the discriminated signal given from the reflection-type optical disk detection circuit 103 (step SP44).

The microcomputer 104 then obtains the negation result at the step SP44 to judge that the mounting optical disk is the hologram disk 3 (step SP45). After that, the disk distinction processing is completed. Further, the microcomputer 104 obtains the affirmation result at the step SP44 to judge that the mounting optical disk is the reflection-type optical disk 4 (step SP46), and the disk distinction processing is then completed.

As described with the embodiment above, since the type of optical disk is discriminated on the basis of the transmitted beam through the optical disk in the optical information recording/reproducing apparatus 100, the user can use the optical information recording/reproducing apparatus 100 without regard to the type of optical disk to be mounted, similarly to the first embodiment. This enables the optical information recording/reproducing apparatus 100 to enhance usability.

(4) Fourth Embodiment

Figure 17:
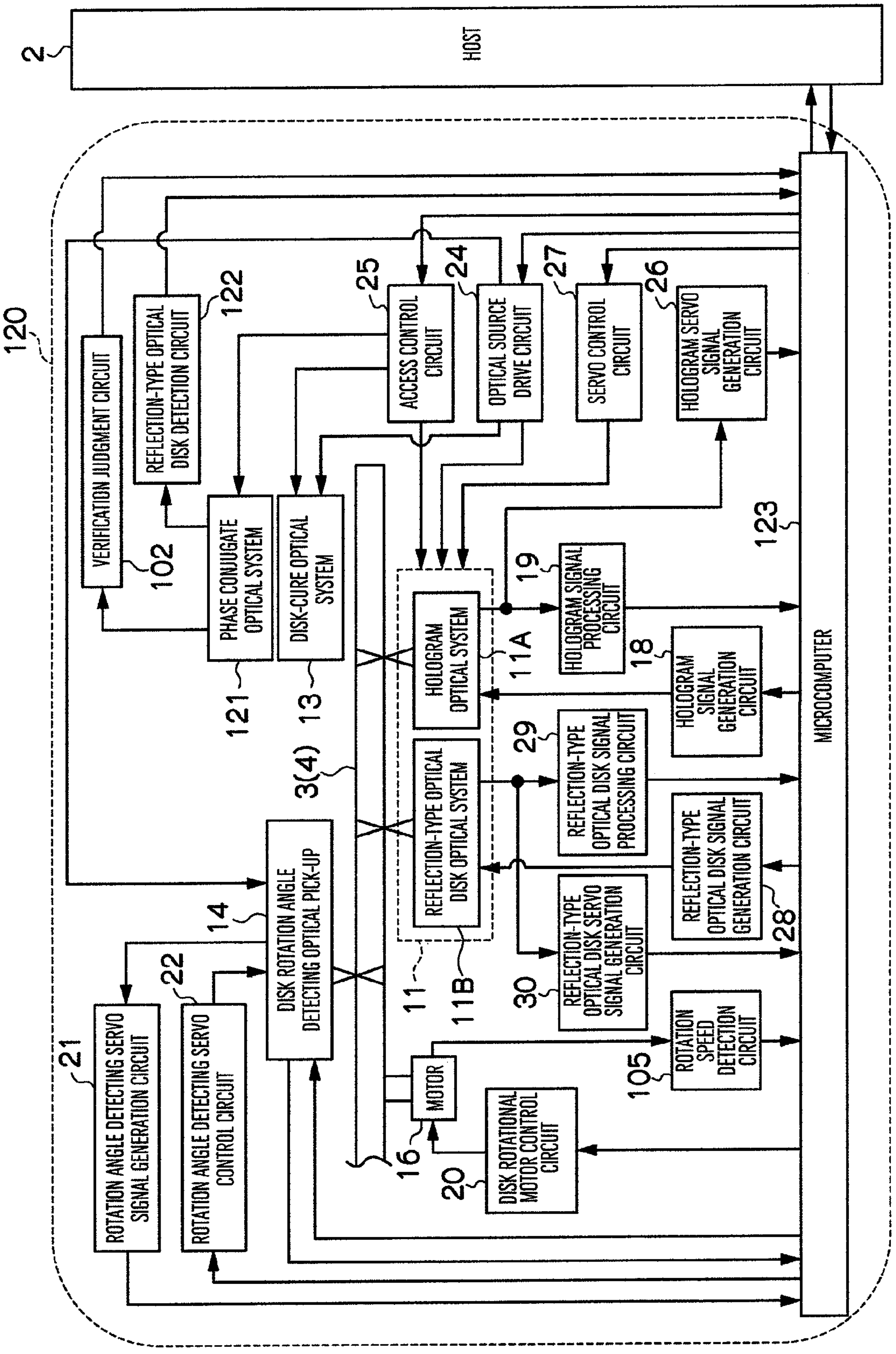
FIG. 17 is a block diagram showing a constitution of the optical information recording/reproducing apparatus in a fourth embodiment.

FIG. 17 shows a constitution of an optical information recording/reproducing apparatus 120 in a fourth embodiment, and the same element shown in FIG. 12 is indicated by the same reference numeral in FIG. 17. The optical information recording/reproducing apparatus 120 has the same constitution as the optical information recording/reproducing apparatus 100 in the third embodiment, except that a red optical beam emitted from the disk rotation angle detecting optical pick-up 14 is used as an optical beam to be irradiated on the optical disk, and the constitution of a phase conjugate optical system 121 is different from the previously described ones, on the disk distinction processing at the step SP2 in FIG. 5.

Figure 18:
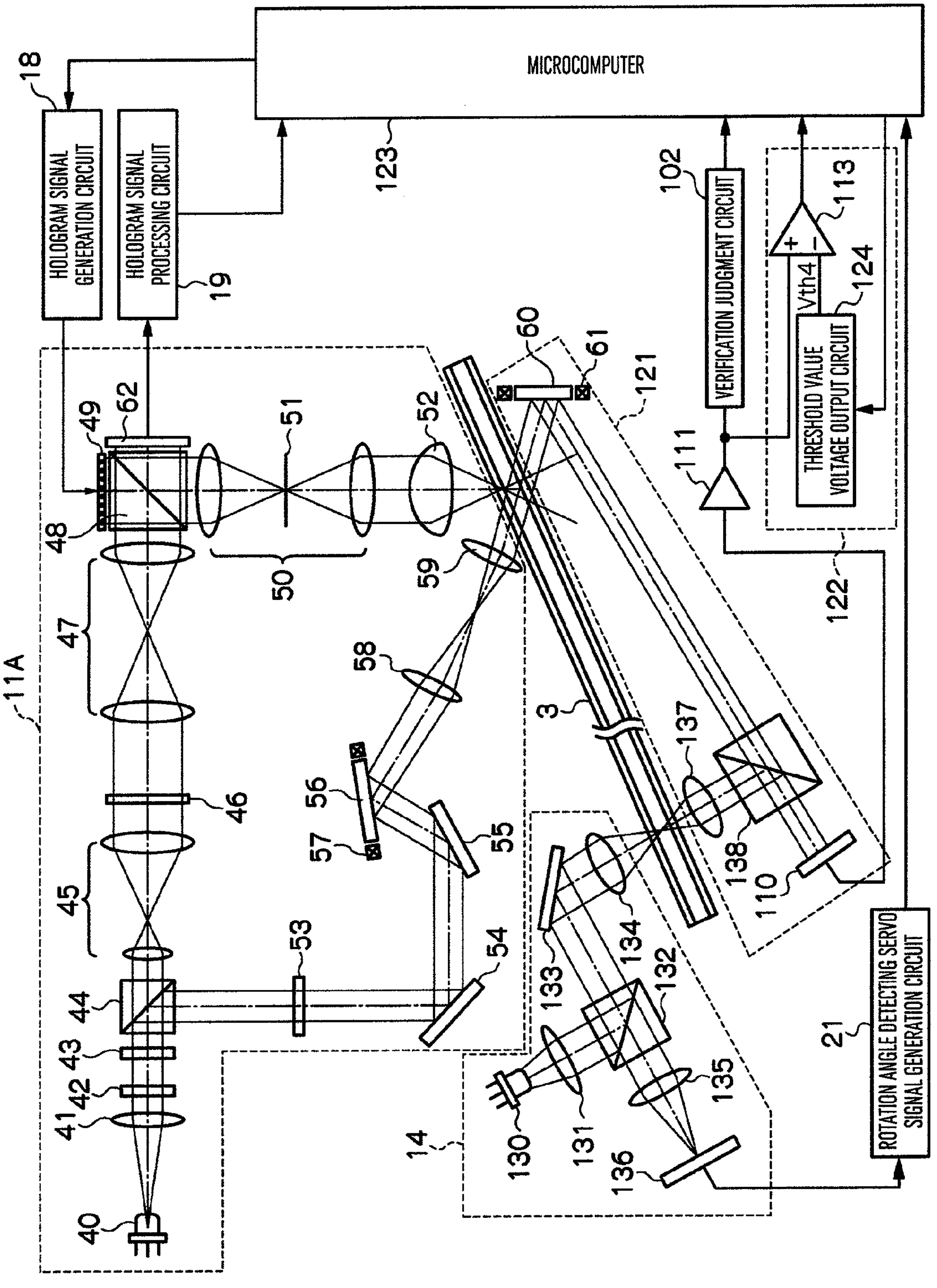
FIG. 18 is a schematic diagram showing a specific constitution of a disk rotation angle detecting optical pick-up and the phase conjugate optical system in the fourth embodiment.
Figure 19:
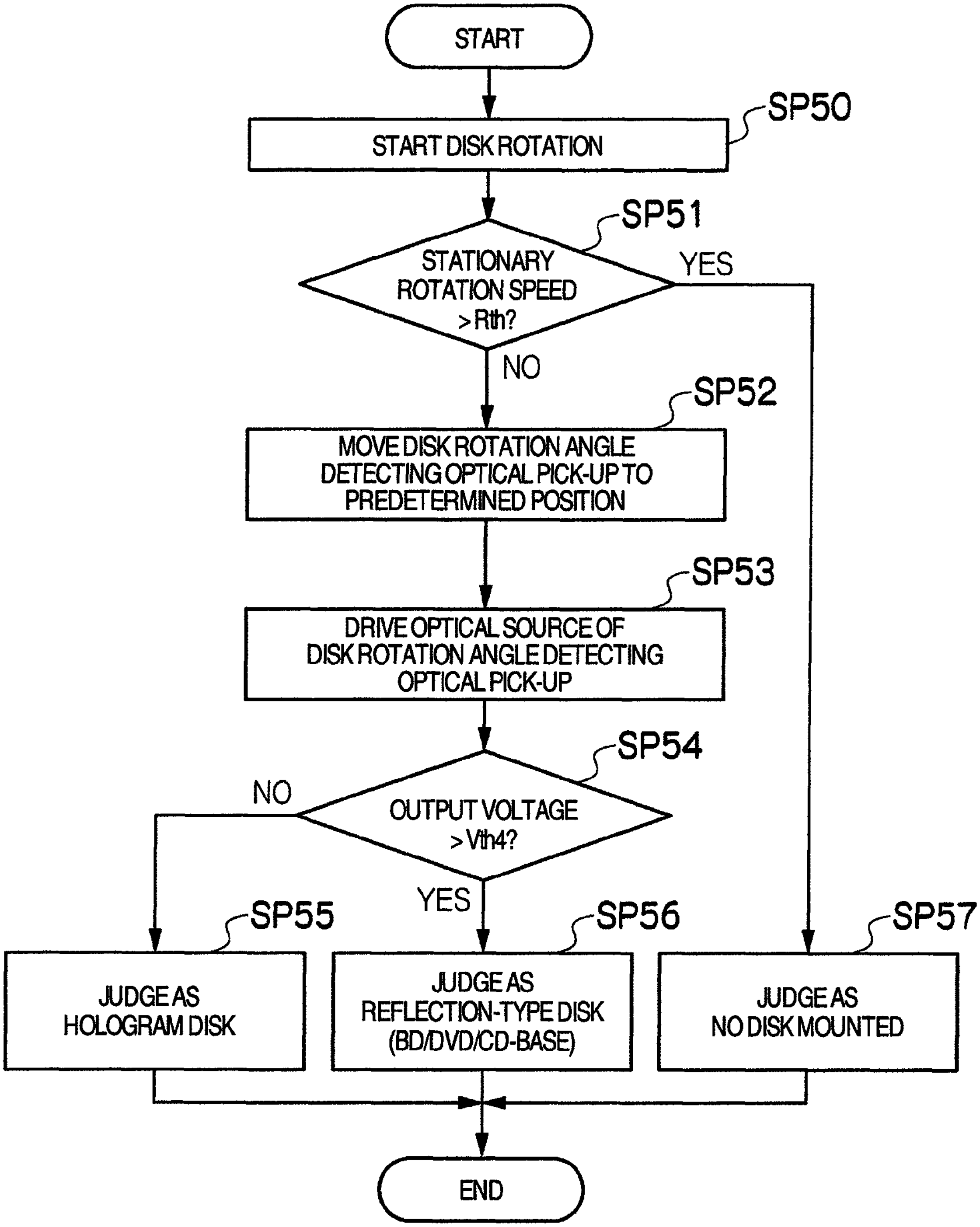
FIG. 19 is a flowchart showing specific processing contents of the disk distinction processing to be executed by the microcomputer in the third embodiment.

FIG. 18 shows a specific constitution of the optical information recording/reproducing apparatus 120 in the embodiment in relation to the disk distinction function, and the same element shown in FIG. 13 is indicated by the same reference numeral in FIG. 18. Referring to FIG. 18, the disk rotation angle detecting optical pick-up 14 provides with an optical source 130 which emits a red beam. On recording/reproducing information in and from the hologram disk 3 in the disk rotation angle detecting optical pick-up 14, the optical beam emitted from the optical source 130 is converted to a parallel beam by a collimate lens 131, and the parallel beam is then incident to an object lens 134 via a polarizing beam splitter 132 and a mirror 133 to be focused by the object lens 134 on the rotation angle control track 3A (FIG. 2) of the hologram disk 3.

A reflected beam of the foregoing optical beam reflected from the hologram disk 3 is incident to the collimate lens 135 via the object lens 134, mirror 133 and polarizing beam splitter 132, and converted to a converged beam by the collimate lens 135 to focus on a light receiving surface of an optical detector 136. In this way, a tracking error signal and a focusing error signal are generated in the rotation angle detection-purposed servo control circuit 22 on the basis of a received signal output from the optical detector 136. On the basis of the tracking error signal and focusing error signal, a tracking control and a focusing control are performed by the microcomputer 123 via the rotation angle detecting servo control circuit 22 (FIG. 17).

On the disk distinction processing at the step SP2 in FIG. 5, the disk rotation angle detecting optical pick-up 14 is moved to the foregoing disk distinction-purposed area provided on the optical disk, and the optical source 130 in the disk rotation angle detecting optical pick-up 14 is driven and turned on at the disk distinction-purposed area.

At this time, the optical beam emitted from the optical source 130 in the disk rotation angle detecting optical pick-up 14 is focused on the information recording surface of the optical disk, similarly to the foregoing operation. However, in the case where the optical disk is the hologram disk 3, the optical beam is transmitted through the optical disk and incident to the optical detector 110 via a lens 137 and a polarizing beam splitter 138 in the phase conjugate optical system 121. The optical detector 110 is used for performing the verification processing at the step SP16 in FIG. 6. However, in the case of this embodiment, the optical detector 110 is used for both the verification processing and disk distinction processing, as a feature of this embodiment. The output voltage of optical detector 110 is then given to a reflection-type optical disk detection circuit 122 via the IV amplifier 111.

The reflection-type optical disk detection circuit 122 is constituted by the same constitution as the reflection-type optical disk detection circuit 103 (FIG. 12) in the third embodiment, except for the case that the threshold value voltage Vth4 outputted from the threshold value voltage output circuit 124 is changed into a predetermined voltage (this is referred to as a threshold value voltage Vth4) that is lower than the output voltage from the optical detector 110 which receives the optical beam emitted from the optical source 130 in the disk rotation angle detecting optical pick-up 14 and transmitted through the hologram disk 3, and higher than the output voltage of optical detector 110 at a time of blocking the optical beam by the reflection-type optical disk 4.

In this way, the reflection-type optical disk detection circuit 122 calculates, in the subtracting circuit 113, a difference between the output voltage of optical detector 110 in the phase conjugate optical system 121 and the threshold value voltage Vth4 output from the threshold value voltage output circuit 124, and a calculated result, as a discriminated signal, is output to the microcomputer 123. The microcomputer 123 then discriminates the type of optical disk which is mounted on the apparatus at this time on the basis of the discriminated signal.

FIG. 9 is a flowchart showing specific processing contents relative to the foregoing disk distinction processing to be executed by the microcomputer 123. The microcomputer 123 executes the disk distinction processing in accordance with a control program stored in an internal memory (not shown).

That is, the microcomputer 123 starts the disk distinction processing when the foregoing recording/reproducing provision processing progresses at the step SP2 in FIG. 5. First, it is judged whether the stationary rotation speed of rotational motor 16 is greater than the predetermined rotation speed threshold value Rth (steps SP50, SP51), similarly to the steps SP40 and SP41 in FIG. 16.

The microcomputer 123 obtains the affirmation result in the judgment at the step SP51 to thereby judge that the optical disk is not mounted on the apparatus (step SP57), and the disk distinction processing is then completed.

On the contrary, the microcomputer 123 obtains the negation result in the judgment at the step SP51 to drive a slide mechanism (not shown) and move the disk rotation angle detecting optical pick-up 14 to a predetermined radial position on the optical disk (step SP52). After that, the optical source 130 (FIG. 18) on the disk rotation angle detecting optical pick-up 14 is driven by controlling the optical source drive circuit 24 (FIG. 12) such that the optical beam is irradiated toward the disk distinction-purposed area on the optical disk (step SP53).

Subsequently, the microcomputer 123 judges whether the output voltage of optical detector 110 is greater than the threshold value voltage Vth4 output from the threshold value voltage output circuit 112 in the reflection-type optical disk detection circuit 103 on the basis of the discriminated signal given from the circuit 103 (step SP54).

The microcomputer 123 then obtains the affirmation result at the step SP54 to judge that the mounting optical disk is the hologram disk 3 (step SP55). After that, the foregoing disk distinction processing is completed. Further, the microcomputer 123 obtains the negation result at the step SP54 to judge that the mounting optical disk is the reflection-type optical disk 4 (step SP56), and the disk distinction processing is then completed.

As described above, in the case of the optical information recording/reproducing apparatus 120 in the embodiment, since the type of optical disk is discriminated on the basis of the transmitted beam through the optical disk, the user can use the optical information recording/reproducing apparatus 120 without regard to the type of optical disk to be mounted, similarly to the first embodiment. This enables the optical information recording/reproducing apparatus 120 to enhance usability.

(5) Other Embodiments

In addition, the first to fourth embodiments have been described with such that the optical source unit to emit the optical beam toward the mounting optical disk and the optical receiving unit to receive the reflected beam of the optical beam or transmitted beam through the optical disk and output the output signal corresponding to the reflected beam or transmitted beam, are constituted by the disk rotation angle detecting optical pick-up 14 (first embodiment), the reflection-type optical disk optical system 11B in the optical pick-up 11 (second embodiment), the hologram optical system 11A and phase conjugate optical system 101 in the optical pick-up 11 (third embodiment), or the disk rotation angle detecting optical pick-up 14 and phase conjugate optical system 121 (fourth embodiment). However, the invention is not limited to the foregoing constitutions. The optical source unit and light receiving unit may be provided separately from the pick-up 14, the optical system 11B in the optical pick-up 11, the optical system 11A and optical system 101 in the optical pick-up 11, or the optical pick-up 14 and optical system 121.

Further, the first to fourth embodiments have been described with such that the discrimination unit for discriminating whether the optical disk is the hologram disk 3 or reflection-type optical disk 4 on the basis of the output signal output from the optical receiving unit, is constituted by the reflection-type disk detection circuit 23, 91, 103 or 122 and the microcomputer 17, 92, 104 or 123. However, the invention is not limited to the foregoing constitution. For example, the microcomputer 17, 92, 104 or 123 may have the function of the reflection-type disk detection circuit 23, 91, 103 or 122, by removing these circuits. Besides, various constitutions may widely be applicable.

Further, the first to fourth embodiments have been described with such that the reflection-type disk detection circuits 23, 91, 103 and 122 are constituted by the threshold value voltage output circuits 85A, 85B, 112 and 124 as the threshold value voltage output unit and the subtracting circuit 83, 84A, 84B and 113 as the difference voltage output unit, respectively. However, the invention is not limited to the foregoing constitution, and various constitutions may widely be applicable.

Further, in the case of the first and second embodiments, the focusing error signal is used for detecting the presence or absence of the optical disk, however, the rotation speed of the rotational motor 16 may also be used for that purpose, similarly to the third and fourth embodiments. In this case, the difference calculation circuit relative to the first threshold value voltage Vth1 can be omitted in the first and second embodiments.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical information recording/reproducing apparatus for recording information in an optical information recording medium and reproducing the information recorded on the medium, comprising:

an optical source unit configured to emit an optical beam toward the optical information recording medium mounted on the apparatus;

an optical receiving unit configured to receive a reflected beam of the optical beam reflected from the optical information recording medium, configured to receive a transmitted beam of the optical beam transmitted through the optical information recording medium, and configured to output an output signal in response to the reflected beam and a different output signal in response to the transmitted beam; and a distinction unit configured to discriminate whether the optical information recording medium comprises an hologram disk for recording information, or comprises a reflection-type optical disk for reproducing information, in accordance with the output signal output from the optical receiving unit.

2. The apparatus according to claim 1, wherein the optical source unit and the optical receiving unit are included in a first optical pick-up; and wherein the optical source unit is configured to irradiate the optical beam on a rotation angle control track formed on an inner circle portion of an hologram disk, in order to control a rotation angle of an hologram disk, and the optical receiving unit is configured to receive the reflected beam of the optical beam reflected from a reflection-type optical disk, in order to output an output signal in response the reflected beam.

3. The apparatus according to claim 2, wherein the distinction unit includes:

a servo signal generation unit configured to generate a focusing error signal of a signal level corresponding to a defocusing amount of the optical beam from the optical information recording medium, in accordance with the output signal output from the optical receiving unit;

a threshold value voltage output unit configured to output a threshold value voltage set between: a peak level of the focusing error signal when an hologram disk is mounted as the optical information recording medium, and a peak level of the focusing error signal when a reflection-type optical disk is mounted as the optical information recording medium; and a difference voltage output unit configured to output a difference voltage between a signal level of the focus error signal and the threshold value voltage; and wherein the optical information recording medium is discriminated as to whether the optical information recording medium comprises an hologram disk or a reflection-type optical disk, in accordance with the difference voltage output from the difference voltage output unit.

4. The apparatus according to claim 1, wherein the optical source unit and the optical receiving unit are included in a second optical pick-up; and wherein the optical source unit is configured to irradiate a red optical beam on the reflection-type optical disk, and the optical receiving unit is configured to receive a reflected beam of the red optical beam reflected from the reflection-type optical disk in order to output an output signal corresponding to the reflected beam.

5. The apparatus according to claim 4, wherein the distinction unit includes:

a servo signal generation unit configured to generate a focusing error signal of a signal level corresponding to a defocusing amount of the optical beam from the optical information recording medium, in accordance with the output signal output from the optical receiving unit;

a threshold value voltage output unit configured to output a threshold value voltage set between: a peak level of the focusing error signal when an hologram disk is mounted as the optical information recording medium, and a peak level of the focus error signal when a reflection-type optical disk is mounted as the optical information recording medium; and a difference voltage output unit configured to output a difference voltage between a signal level of the focusing error signal and the threshold value voltage; and wherein the optical information recording medium is discriminated as to whether the optical information recording medium comprises an hologram disk, or a reflection-type optical disk, in accordance with the difference voltage output from the difference voltage output unit.

6. The apparatus according to claim 1, wherein the optical source unit is included in a third optical pick-up configured to irradiate a reference beam on an hologram disk for reproducing information from the hologram disk; and wherein the optical receiving unit is included in a phase conjugate optical system that is provided on an opposite side of the optical source unit as based on the optical information recording medium, in order to generate and output a phase conjugate beam of the reference beam emitted from the optical source.

7. The apparatus according to claim 6, wherein the distinction unit includes:

a threshold value voltage output unit configured to output a threshold value voltage set between: an output voltage of the optical receiving unit when an hologram disk is mounted as the optical information recording medium, and an output voltage of the optical receiving unit when a reflection-type optical disk is mounted as the optical information recording medium; and a difference voltage output unit configured to output a difference voltage between the output voltage of the optical receiving unit and the threshold value voltage; and wherein the optical information recording medium is discriminated as to whether the optical information recording medium comprises an hologram disk or a reflection-type optical disk, in accordance with the difference voltage output from the difference voltage output unit.

8. The apparatus according to claim 1, wherein the optical source unit is included in a fourth optical pick-up configured to irradiate a red optical beam on a rotation angle control track formed on an inner circle portion of an hologram disk in order to control a rotation angle of the hologram disk; and wherein the optical receiving unit is included in a phase conjugate optical system that is provided on an opposite side of the optical source unit via the optical information recording medium, in order to generate and output a phase conjugate beam of a reference beam emitted from a fifth optical pick-up on reproducing the information from the hologram disk.

9. The apparatus according to claim 8, wherein the distinction unit includes:

a threshold value voltage output unit configured to output a threshold value voltage set between: an output voltage of the optical receiving unit when an hologram disk is mounted as the optical information recording medium, and an output voltage of the optical receiving unit when a reflection-type optical disk is mounted as the optical information recording medium; and a difference voltage output unit configured to output a difference voltage between the output voltage of the optical receiving unit and the threshold value voltage; and wherein the optical information recording medium is discriminated as to whether it is an hologram disk or a reflection-type optical disk, in accordance with the difference voltage output from the difference voltage output unit.

10. The apparatus according to claim 1, wherein the distinction unit discriminates a presence or absence of the optical information recording medium, in accordance with the output signal output from the optical receiving unit.

11. The apparatus according to claim 1 further comprising:

a motor that drives rotatably the optical information recording medium; and a rotation speed detection unit that detects a rotation speed of the motor, wherein the distinction unit discriminates a presence or absence of the optical information recording medium, in accordance with the motor rotation speed detected by the rotation speed detection unit.

12. A disk distinction method of recording information in an optical information recording medium and reproducing the information recorded on the medium in an optical information recording/reproducing apparatus, comprising the steps of:

emitting an optical beam toward the optical information recording medium mounted on the apparatus;

receiving a reflected beam of the optical beam reflected from the optical information recording medium if the optical information recording medium comprises a reflection-type optical disk, and receiving a transmitted beam of the optical beam transmitted through the optical information recording medium if the optical information recording medium comprises an hologram disk;

outputting an output signal in response to the reflected beam and a different output signal in response to the transmitted beam; and discriminating whether the optical information recording medium is an hologram disk for recording information, or a reflection-type optical disk for reproducing information, in accordance with the output signal.

* * * * *